US012658120B2

(12) United States Patent
Zhang

(10) Patent No.: US 12,658,120 B2
(45) Date of Patent: Jun. 16, 2026

(54) SPLICING DISPLAY SCREEN AND DISPLAY METHOD THEREOF

(71) Applicant: BOE TECHNOLOGY GROUP CO., LTD., Beijing (CN)

(72) Inventor: Shuguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/190,258

(22) Filed: Apr. 25, 2025

(65) Prior Publication Data

US 2025/0252888 A1 Aug. 7, 2025

Related U.S. Application Data

(63) Continuation-in-part of application No. 18/284,241, filed as application No. PCT/CN2022/102992 on Jun. 30, 2022, now Pat. No. 12,315,432.

(51) Int. Cl.
*G09G 3/32* (2016.01)

(52) U.S. Cl.
CPC ......... *G09G 3/32* (2013.01); *G09G 2300/026* (2013.01); *G09G 2320/0257* (2013.01); *G09G 2320/041* (2013.01); *G09G 2360/16* (2013.01)

(58) Field of Classification Search
CPC ............... G09G 3/32; G09G 2300/026; G09G 2320/0257; G09G 2320/041; G09G 2360/16
See application file for complete search history.

(56) References Cited

U.S. PATENT DOCUMENTS

| | | | | |
|---|---|---|---|---|
| 8,879,027 B2 * | 11/2014 | Ishii | G02F 1/133382 349/72 |
| 10,657,905 B2 * | 5/2020 | Li | G01K 1/14 |
| 10,872,575 B2 * | 12/2020 | Chang | G02F 1/1685 |
| 2018/0090062 A1 * | 3/2018 | Nakamura | G09G 3/3233 |
| 2023/0298518 A1 * | 9/2023 | Tang | G09G 3/3233 345/691 |
| 2024/0177645 A1 * | 5/2024 | Lee | G09G 3/3225 |
| 2024/0249664 A1 * | 7/2024 | Wang | G09G 3/006 |
| 2025/0046229 A1 * | 2/2025 | Wang | G09G 3/2074 |
| 2025/0087128 A1 * | 3/2025 | Wu | G09G 3/2074 |
| 2025/0095534 A1 * | 3/2025 | Wu | G09G 3/20 |

FOREIGN PATENT DOCUMENTS

| | | | |
|---|---|---|---|
| CN | 112053658 A * | 12/2020 | G09G 3/32 |

* cited by examiner

*Primary Examiner* — Gene W Lee
(74) *Attorney, Agent, or Firm* — HOUTTEMAN LAW LLC

(57) ABSTRACT

Disclosed is a splicing display screen, including a gray scale compensation circuit. The gray scale compensation circuit includes a receiving sub-circuit and a processor; the receiving sub-circuit is configured to receive a plurality of instantaneous temperatures measured by all temperature sensors, and send the plurality of temperatures to the processor as instantaneous temperature data; and the processor is configured to determine, according to the instantaneous temperature data and a pre-generated steady-state temperature matrix, a gray scale compensation coefficient of each display area; and perform, according to the gray scale compensation coefficient, gray scale compensation on current frame image data to obtain compensated frame image data.

18 Claims, 16 Drawing Sheets

SPLICING DISPLAY SCREEN AND DISPLAY METHOD THEREOF

CROSS-REFERENCE TO RELATED APPLICATION

This is a continuation-in-part application of a National Phase application Ser. No. 18/284,241 entitled "SPLICING DISPLAY SCREEN AND DISPLAY METHOD THEREOF" filed on Sep. 26, 2023, which is filed under 35 U.S.C. 371 as a national stage of PCT/CN 2022/102992 filed on Jun. 30, 2022, the content of each of which is hereby incorporated by reference in its entirety.

TECHNICAL FIELD

The present disclosure relates to the technical field of image display, and specifically relate to a splicing display screen and a display method thereof.

BACKGROUND

With the rapid development of mini light-emitting diode (mini LED) display technology, the mini LED display product has begun to be applied to the field of high definition display of super large display screens. In the working process of mini LEDs, when the display screen is lit for a long time, a large amount of heat energy produced by electronic components therein cannot be dissipated in time, resulting in a temperature increment of the screen and temperature differences among different areas. Since the luminous efficiency of a screen decreases as the temperature rises, a visible residual image may occur on the screen upon switching of display images. Therefore, how to eliminate the visible residual image on the screen and improve the display effect of the screen has become an urgent problem to be solved in the field of current display screens.

SUMMARY

To solve at least one of the technical problems in the existing art, the present disclosure provides a splicing display screen and a display method thereof.

In a first aspect, an embodiment of the present disclosure provides a splicing display screen, including a gray scale compensation circuit configured to perform gray scale compensation on display data; wherein the splicing display screen includes a plurality of display panels spliced with each other and each including one or more display areas, and each display area is provided with one temperature sensor configured to measure a temperature of the display area where the temperature sensor is located, and send the measured temperature to the gray scale compensation circuit; wherein the gray scale compensation circuit includes a receiving sub-circuit and a processor;

- the receiving sub-circuit is configured to receive a plurality of instantaneous temperatures measured by all temperature sensors, and send the plurality of temperatures to the processor as instantaneous temperature data; and
- the processor is configured to determine, according to the instantaneous temperature data and a pre-generated steady-state temperature matrix, a gray scale compensation coefficient of each display area; and perform, according to the gray scale compensation coefficient, gray scale compensation on current frame image data to obtain compensated frame image data.

In some examples, the processor includes a compensation coefficient determining module, and a gray scale compensation module;

- the compensation coefficient determining module is configured to determine the gray scale compensation coefficient of each display area; and
- the gray scale compensation module is configured to perform, according to the gray scale compensation coefficient, gray scale compensation on the current frame image data to obtain the compensated frame image data.

In some examples, the compensation coefficient determining module includes a steady-state temperature matrix acquisition unit, an instantaneous temperature data acquisition unit, an instantaneous temperature normalization calculation unit, and a compensation coefficient determining unit;

- the steady-state temperature matrix acquisition unit is configured to acquire the steady-state temperature matrix, and send the steady-state temperature matrix to the compensation coefficient determining unit;
- the instantaneous temperature data acquisition unit is configured to acquire the instantaneous temperature data, and send the instantaneous temperature data to the instantaneous temperature normalization calculation unit;
- the instantaneous temperature normalization calculation unit is configured to perform normalization calculation on the instantaneous temperature data to obtain normalized instantaneous temperature data, and send the normalized instantaneous temperature data to the compensation coefficient determining unit; and
- the compensation coefficient determining unit is configured to determine the gray scale compensation coefficient of the display area according to the steady-state temperature matrix and the normalized instantaneous temperature data.

In some examples, the steady-state temperature matrix acquisition unit includes a first random access memory, and each element in the steady-state temperature matrix is a normalized steady-state temperature with a data length of 14 bits.

In some examples, the instantaneous temperature data acquisition unit includes a second random access memory, and each instantaneous temperature in the instantaneous temperature data has a data length of 12 bits.

In some examples, the splicing display screen further includes:

- a first read-only memory configured to store a first correspondence table, wherein the first correspondence table is a one-dimensional array including a plurality of preset normalization coefficients each corresponding to one preset instantaneous temperature,
- wherein the instantaneous temperature normalization calculation unit is configured to: determine, from the instantaneous temperature data, a highest instantaneous temperature with a maximum value; look up a normalization coefficient corresponding to the highest instantaneous temperature from the first read-only memory; and multiply each instantaneous temperature by the found normalization coefficient to obtain the normalized instantaneous temperature data.

In some examples, the splicing display screen further includes:

- a third random access memory configured to access the normalized instantaneous temperature data; and a second read-only memory configured to store a second correspondence table, wherein the second correspondence table is a two-dimensional array including a plurality of proportionality coefficients, each of which simultaneously corresponds to a display area in the splicing display screen and an instantaneous temperature, and is a ratio of a steady-state temperature of the display area to the instantaneous temperature, wherein the compensation coefficient determining unit is configured to: store the normalized instantaneous temperature data on the third random access memory, and determine a highest normalized instantaneous temperature with a maximum value; look up a corresponding proportionality coefficient from the second read-only memory according to an address of the display area corresponding to the highest normalized instantaneous temperature; multiply each normalized instantaneous temperature by the found proportionality coefficient to obtain a full-screen instantaneous matrix; and subtract the full-screen instantaneous matrix from the steady-state temperature matrix, to obtain the gray scale compensation coefficient of each display area.

In some examples, each normalized instantaneous temperature in the normalized instantaneous temperature data has a data length of 18 bits.

In some examples, the compensation coefficient determining unit is further configured to: perform truncation after each normalized instantaneous temperature is multiplied by the found proportionality coefficient, such that each element in the full-screen instantaneous matrix has the same data length as each element in the steady-state temperature matrix.

In some examples, the gray scale compensation module includes a gray scale value calculation unit, a compensation coefficient allocation unit, and a pixel compensation unit;

the gray scale value calculation unit is configured to perform color space conversion on each pixel corresponding to the current frame image data, determine a luminance component of each pixel in a target color space, and send the luminance component to the pixel compensation unit as first gray scale data;

the compensation coefficient allocation unit is configured to allocate to each pixel a gray scale compensation coefficient of a display area where the pixel is located, and send the allocated gray scale compensation coefficient to the pixel compensation unit; and the pixel compensation unit is configured to compensate each channel value of the pixel according to the first gray scale data of the pixel and the allocated gray scale compensation coefficient.

In some examples, the gray scale value calculation unit is configured to calculate the first gray scale data by:

$$\text{y\_data} = R*a + G*b + B*c,$$

where y_data represents the first gray scale data, R, G and B represent a red channel value, a green channel value, and a blue channel value, respectively, and a, b and c represent preset first conversion factors of the red channel value, the green channel value, and the blue channel value, respectively.

In some examples, the splicing display screen further includes:

a fourth random access memory configured to access the compensation coefficient, wherein the compensation coefficient allocation unit is configured to look up a corresponding compensation coefficient from the fourth random access memory according to an address of the display area where the pixel is located, and allocate the found compensation coefficient to the pixel.

In some examples, the pixel compensation unit is configured to: calculate a gray scale compensation value according to the gray scale compensation coefficient and the first gray scale data; calculate a compensation value of each channel according to the gray scale compensation value; and calculate each compensated channel value of the pixel according to the compensation value of each channel.

In some examples, the pixel compensation unit calculates the gray scale compensation value by:

$$\text{comp\_y} = \text{y\_data} * bram4\text{\_data},$$

where comp_y represents the gray scale compensation value, y_data represents the first gray scale data, and bram4_data represents the gray scale compensation coefficient.

In some examples, the pixel compensation unit calculates the compensation value of each channel by:

$$\text{comp\_rdata} = \text{comp\_y} * \text{R\_FACTOR};$$

$$\text{comp\_gdata} = \text{comp\_y} * \text{G\_FACTOR}; \text{ and}$$

$$\text{comp\_bdata} = \text{comp\_y} * \text{B\_FACTOR};$$

where comp_rdata, comp_gdata and comp_bdata represent compensation values for red, green, and blue channels, respectively, comp_y represents the gray scale compensation value, and R_FACTOR, G_FACTOR and B_FACTOR represent preset second conversion factors for the red, green and blue channels, respectively.

In some examples, the pixel compensation unit calculates the compensated value of each channel by:

$$R' = R - \text{comp\_rdata};$$

$$G' = G - \text{comp\_gdata}; \text{ and}$$

$$B' = B - \text{comp\_bdata};$$

where R', G' and B' represent the compensated red channel value, green channel value, and blue channel value, respectively, and comp_rdata, comp_gdata and comp_bdata represent compensation values for red, green, and blue channels, respectively.

In a second aspect, an embodiment of the present disclosure further provides a display method of a splicing display screen applied for gray scale compensation on display data; wherein the splicing display screen includes a plurality of display panels spliced with each other and each including one or more display areas, and each display area is provided with one temperature sensor configured to measure a temperature of the display area where the temperature sensor is located, and send the measured temperature to the gray scale compensation circuit; wherein the gray scale compensation circuit includes a receiving sub-circuit and a processor; wherein the method includes:

receiving, by the receiving sub-circuit, a plurality of instantaneous temperatures measured by all temperature sensors, and sending the plurality of temperatures to the processor as instantaneous temperature data; and determining, by the processor and according to the instantaneous temperature data and a pre-generated steady-state temperature matrix, a gray scale compensation coefficient of each display area; and performing, according to the gray scale compensation coefficient, gray scale compensation on current frame image data to obtain compensated frame image data.

In a third aspect, an embodiment of the present disclosure further provides an electronic product, including the splicing display screen according to the first aspect.

DETAIL DESCRIPTION OF EMBODIMENTS

Figure 1:
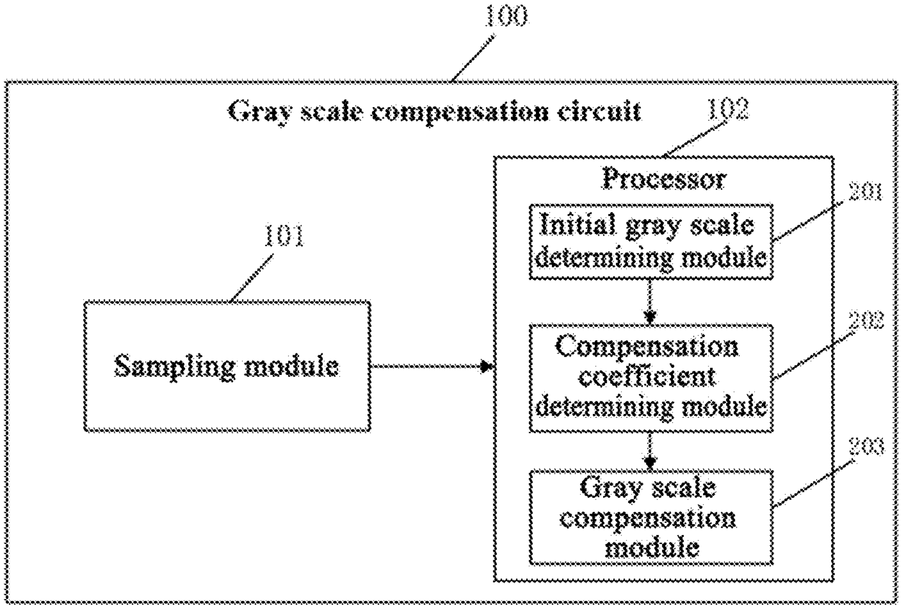
FIG. 1 is a schematic diagram of a gray scale compensation circuit in a splicing display screen according to an embodiment of the present disclosure.

To improve understanding of the technical solution of the present disclosure for those skilled in the art, the present disclosure will be described in detail below with reference to accompanying drawings and specific implementations.

Unless otherwise defined, technical or scientific terms used in the present disclosure are intended to have general meanings as understood by those of ordinary skill in the art. The words "first", "second" and similar terms used in the present disclosure do not denote any order, quantity, or importance, but are used merely for distinguishing different components from each other. Also, the use of the terms "a", "an", or "the" and similar referents do not denote a limitation of quantity, but rather denote the presence of at least one. The word "include" or "comprise" or the like means that the element or item preceding the word includes elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", or the like are merely used to indicate a relative positional relationship, and when an absolute position of the described object is changed, the relative positional relationship may be changed accordingly.

It has been found in researches that the temperature of a splicing screen, such as a mini LED splicing screen, will rise due to a large amount of heat energy generated by working electronic components, leading to attenuation in luminous efficiency of the LED. Since the gray scales displayed in display areas across the screen are not uniform, luminance of the red channel R differs between display areas displaying a higher gray scale for a long time and display areas displaying a lower gray scale for a long time. When such different areas display a same gray scale, cyan and red spots, i.e., residual shadows, will appear in the image, which may severely interfere with consistency of the display image.

Based on this, the present disclosure provides a splicing display screen, including a gray scale compensation circuit. The gray scale compensation circuit may be integrated in a field-programmable gate array (FPGA), and configured to perform gray scale compensation on a display image. In this embodiment, the splicing display screen includes a gray scale compensation circuit which can sample, according to a preset sequence order (i.e., a playing order of a video frame sequence), frame image data in a video frame sequence, and perform, after sampling each frame image data, gray scale compensation on the sampled current frame image data. During the gray scale compensation, an influence of historical frame image data on a gray scale of the current frame image data, and an influence of other display panels on a gray scale of a target display panel in a preset area are fully considered. In other words, time domain weighted gray scale data of the display area and spatial domain weighted gray scale data of the target display panel where the display area is located are determined, from which a more accurate gray scale compensation coefficient of the display area can be determined. The gray scale compensation coefficient is used in gray scale compensation on the current frame image data of the display area, so that visible residual shadows of the display area can be eliminated, uniformity and consistency of the display image can be improved, and thus visual experience of a user is further improved.

The following describes in detail the gray scale compensation of the display data in the splicing display screen in combination with a specific structure of a gray scale compensation circuit in the splicing display screen. The splicing display screen includes a plurality of display panels spliced with each other and each divided into a plurality of display areas. FIG. 1 is a schematic diagram of a gray scale compensation circuit in a splicing display screen according to an embodiment of the present disclosure. As shown in FIG. 1, the gray scale compensation circuit 100 includes a sampling module 101 and a processor 102.

The sampling module 101 is configured to sample, according to a preset sequence order, frame image data in a video frame sequence to obtain current frame image data.

Specifically, the preset sequence order is a playing order of the video frame sequence on the splicing display screen. Here, the frame image data in the video frame sequence may be sampled in a continuous mode; or in a frame skipping mode, where the specific number of skipped frames may be set empirically, which is not limited in the present disclosure.

It should be noted that for the frame image data obtained by sampling, the current frame image data is frame image data acquired from the video frame sequence at a current moment according to the preset sequence order. Frame image data sampled before the current moment is recorded as historical frame image data.

The processor 102 is configured to determine initial gray scale compensation data, according to first gray scale data of each pixel in the current frame image data and a pre-generated gray scale compensation data table; determine a gray scale compensation coefficient of each display area; determine target gray scale compensation data according to the gray scale compensation coefficient and the initial gray scale compensation data; and perform, according to the target gray scale compensation data, gray scale compensation on the current frame image data to obtain compensated frame image data.

The processor 102 includes an initial gray scale determining module 201, a compensation coefficient determining module 202, and a gray scale compensation module 203.

The initial gray scale determining module 201 is configured to determine initial gray scale compensation data, according to first gray scale data of each pixel in the current frame image data and a pre-generated gray scale compensation data table.

The acquired frame image data includes gray scale data of each pixel in the image, and similarly, the current frame image data includes first gray scale data of each pixel in a current frame image.

The first gray scale data of a pixel may be directly acquired. For example, pixels in the image data are signals driven by current. Further, the first gray scale data corresponds to intensity of signals. When the current frame image data is acquired, the first gray scale data of the pixel may be directly acquired according to the detected signal intensity of each pixel in the current frame image data. Alternatively, the first gray scale data of a pixel may be determined from pixel information of sub-pixels of the pixel, and for the specific process, reference may be made to the following implementation process of the first pre-processing module 105, which is not described here.

The gray scale compensation data table may be generated in advance, and may be directly acquired. For the generation process of the gray scale compensation data table, reference may be made to the processing of the second preset module below, which will not be described in detail here.

The gray scale compensation data table includes gray scale data, compensation data for each gray scale, and a peak luminance variation factor. The processing unit is specifically configured to screen out a target compensation gray scale from the gray scale compensation data table according to the first gray scale data; and determine the initial gray scale compensation data according to the target compensation gray scale and the peak luminance variation factor.

The peak luminance variation factor is a variation factor $\alpha$ calculated under different measured peak luminances in consideration of peak luminance variations of the splicing display screen, where $\alpha$=actual peak luminance/measured peak luminance, and the actual peak luminance is fixed to 400 nit and may be determined according to relevant parameters of the actual splicing screen. According to the first gray scale data, the gray scale compensation data table is searched for a target compensation gray scale $\Delta d$ of the obtained first gray scale data; and according to the currently set measured peak luminance of the splicing display screen, a peak luminance variation factor $\gamma$ is determined. Then, the found target compensation gray scale $\Delta d$ of the first gray scale data is multiplied by the peak luminance variation factor $\gamma$ to obtain initial gray scale compensation data $d_0$ corresponding to a pixel. That is, $d_0=\Delta d\times\gamma$.

The compensation coefficient determining module 202 is configured to determine a gray scale compensation coefficient of each display area. Determining the gray scale compensation coefficient of a display area includes: obtaining the gray scale compensation coefficient of the display area according to determined time domain weighted gray scale data and temperature influence coefficient of the display area, and spatial domain weighted gray scale data of a target display panel where the display area is located.

The time domain weighted gray scale data can represent an influence of at least one frame of historical frame image data of the display area on a gray scale of the current frame image data. The spatial domain weighted gray scale data can represent an influence of other display panels in a preset area taking the target display panel as a center on a gray scale of the target display panel. The other display panels here are display panels in the preset area except the target display panel. The temperature influence coefficient is generated in advance, and for the generation process thereof, reference may be made to the processing of the fourth pre-processing module 108 described below, which will not be described in detail here. During the pre-processing, a central display area in a certain preset area is lit to determine an influence of the central display area on temperatures of other display areas in the preset area, and thus determine a temperature influence coefficient of each display area in the preset area. Here, the other display areas are display areas within the preset area other than the lit central display area.

Figure 2A:
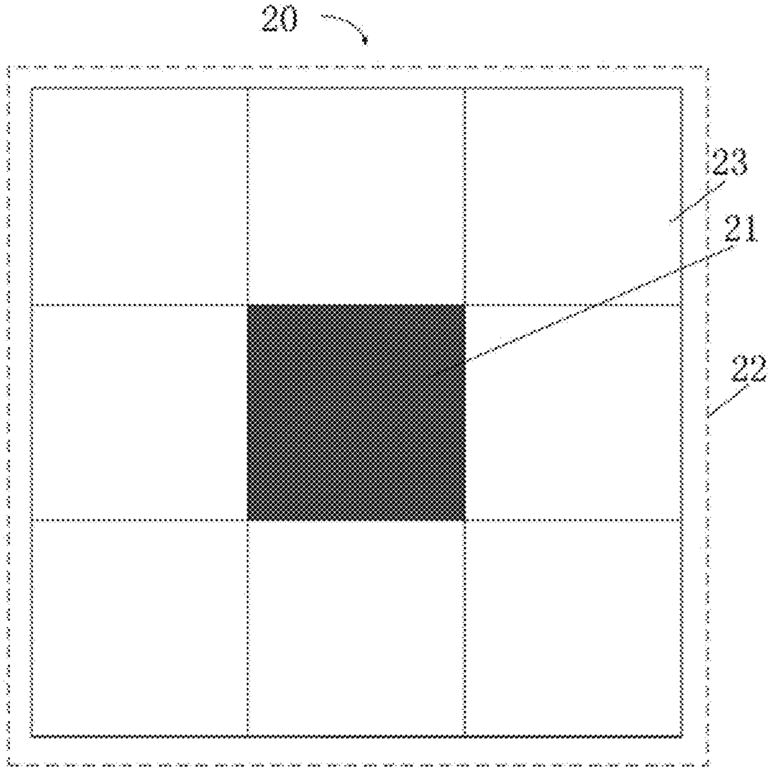
FIGS. 2*a* and 2*b* are schematic diagrams of a target display panel at different positions of a splicing display screen according to embodiments of the present disclosure.
Figure 2B:
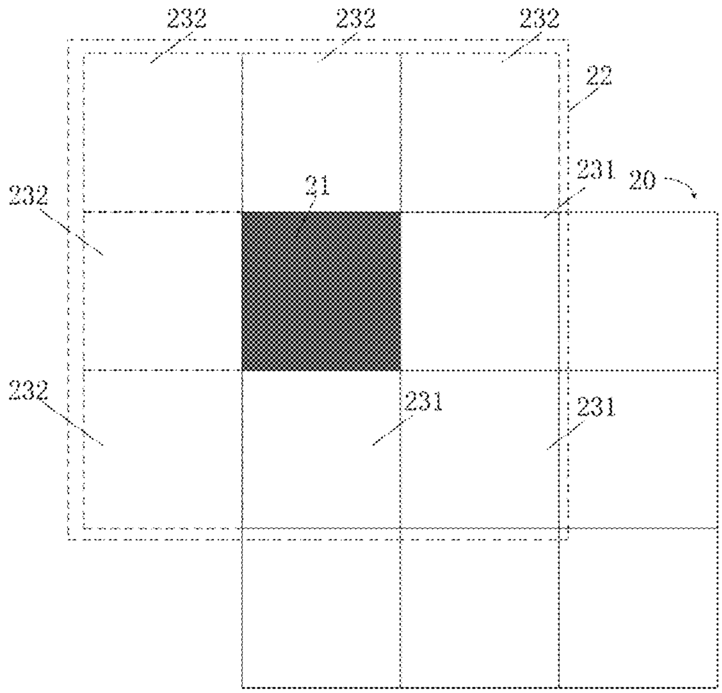

FIGS. 2*a* and 2*b* are schematic diagrams of a target display panel at different positions of a splicing display screen according to embodiments of the present disclosure. As shown in FIG. 2*a*, a target display panel 21 where a display area is located may be a display panel in a non-edge area of the splicing display screen 20 (for example, the shown rectangular box filled with gray). Taking a preset area 22 including 3×3 display panels as an example, other display panels 23 in the preset area 22 are real display panels (shown by solid rectangular boxes) around the target display panel 21. Alternatively, as shown in FIG. 2*b*, the target display panel 21 where the display area is located may be a display panel in an edge area of the splicing display screen 21. Taking a preset area 22 including 3×3 display panels as an example, other display panels 23 in the preset area 22 include virtual display panels 232 around the target display panel 21, and preset and adjacent virtual display panels 232 around the target display panel 21.

Figure 3:
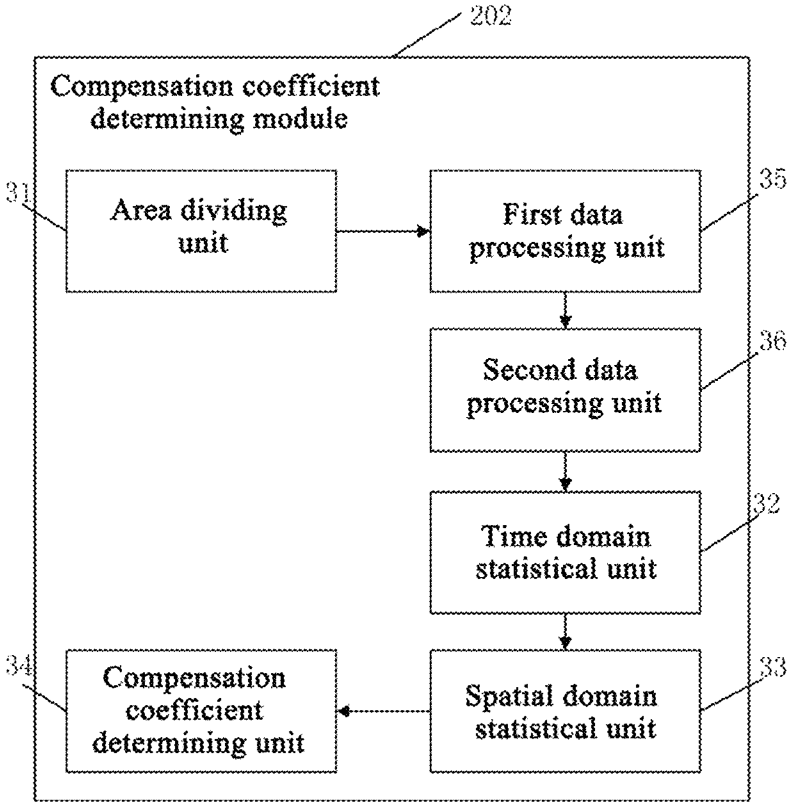
FIG. 3 is a schematic structural diagram of a compensation coefficient determining module according to an embodiment of the present disclosure.

FIG. 3 is a schematic structural diagram of a compensation coefficient determining module according to an embodiment of the present disclosure. As shown in FIG. 3, the compensation coefficient determining module 202 includes an area dividing unit 31, a time domain statistical unit 32, a spatial domain statistical unit 33, and a compensation coefficient determining unit 34. It should be noted that the area dividing unit 31, the time domain statistical unit 32, and the spatial domain statistical unit 33 may be integrated into a processor for calculating the gray scale compensation coefficient of each pixel. For clarity of description of the determination process of the gray scale compensation coefficient, functions of the modules are described in detail below.

The area dividing unit 31 is configured to divide, according to preset resolution information of each display panel, the display panel to obtain display areas.

The splicing display screen includes a plurality of display panels spliced with each other and each divided into a plurality of display areas. Taking a splicing display screen including 24×12 display panels with a resolution of 159 (or 162)×180 as an example, each display panel is divided into k×k display areas, where k may be 3 or 5. Taking k=3 as an example, the splicing display screen includes 72×36 display areas, each having a resolution of 53 (or 54)×60 pixels.

The time domain statistical unit 32 is configured to determine, according to at least one frame of historical frame image data of the display area and a target influence coefficient of each frame of the historical frame image data on the current frame image data, time domain weighted gray scale data of the display area. In a specific implementation, the time domain statistical unit 32 is deployed with a first preset algorithm, and the at least one frame of historical frame image data and the target influence coefficient of each frame of the historical frame image data on the current frame image data are used as input data of the first preset algorithm. Then, time domain weighted gray scale data of the historical frame image data on each display area in the current frame image data is output.

Here, the first preset algorithm may be a preset weighted summation algorithm. The target influence coefficient of each frame of the historical frame image data is predetermined and may be directly acquired. For the setting process of the target influence coefficient of each frame of the historical frame image data, reference may be made to the detailed description of the third pre-processing module 107 below, and will not be described in detail here. It should be noted that a sum of all target influence coefficients is 1, that is, $$\sum_{i=0}^{N} a_i = 1,$$

where $a_i$ represents the target influence coefficient corresponding to an $i^{th}$ frame of the historical frame image data, and N represents N frames of the historical frame image data.

In some examples, in determination of the time domain weighted gray scale data of a display area, the time domain statistical unit 32 is specifically configured to perform, according to a target influence coefficient of each frame of the historical frame image data on the current frame image data, weighting on the second gray scale data in each frame of the historical frame image data of the display area, to obtain the time domain weighted gray scale data of the display area.

The second gray scale data in the historical frame image data of the display area is an average gray scale of the pixels corresponding to the display area in the historical frame image data. For example, the historical frame image data is displayed across the splicing display screen, and the historical frame image data in a display area A includes h×w pixels, where the gray scale data of a pixel (x,y) is denoted as $Gray^{(x,y)}$, and the second gray scale data of the display area A is denoted as $Gray'^{A}$, so the second gray scale data $$Gray'^{A} = \frac{1}{h \times w} \sum_{x=1,y=1}^{(h,w)} Gray^{(x,y)},$$

where x∈[1, h], and y∈[1, w].

Specifically, time domain weighted gray scale data $$Gray^{A}_{mean}$$

of the display area A may be determined according to the following equation 1:

$$Gray^{A}_{mean} = \sum_{i=0}^{N} Gray'^{A}_{i} * a_i, \quad \text{Equation 1}$$

where $$Gray'^{A}_{i}$$

represents second gray scale data in an $i^{th}$ frame of the historical frame image data of the display area A. The time domain weighted gray scale data of other display areas may also be determined according to equation 1, and repeated descriptions are omitted.

The spatial domain statistical unit 33 is configured to determine, according to the time domain weighted gray scale data and the temperature influence coefficient of each display area in the preset area, spatial domain weighted gray scale data of the target display panel. In a specific implementation, the spatial domain statistical unit 33 is deployed with a second preset algorithm, and the time domain weighted gray scale data and the temperature influence coefficient of each display area in the preset area are used as input data of the second preset algorithm. Then, the spatial domain weighted gray scale data of the target display panel is output.

The second preset algorithm may be a neural network algorithm that performs convolution filtering on the time domain weighted gray scale data using the temperature influence coefficient.

It should be noted that the temperature influence coefficient is generated in advance, and in the form of an M×M filtering coefficient matrix. The temperature influence coefficients correspond to the display areas in the preset area in one-to-one correspondence. That is, the preset area includes M×M display areas. Taking a preset area including 3×3 display panels each including 3×3 display areas as an example, the preset area includes 9×9 display areas, and the filtering coefficient matrix includes 9×9 temperature influence coefficients.

In some examples, in determination of the spatial domain weighted gray scale data of a target display panel, the spatial domain statistical unit 33 is specifically configured to perform, according to the temperature influence coefficient of each display area in the preset area, weighting on the time domain weighted gray scale data of each display area in the preset area, to determine the spatial domain weighted gray scale data of the target display panel.

Figure 4A:
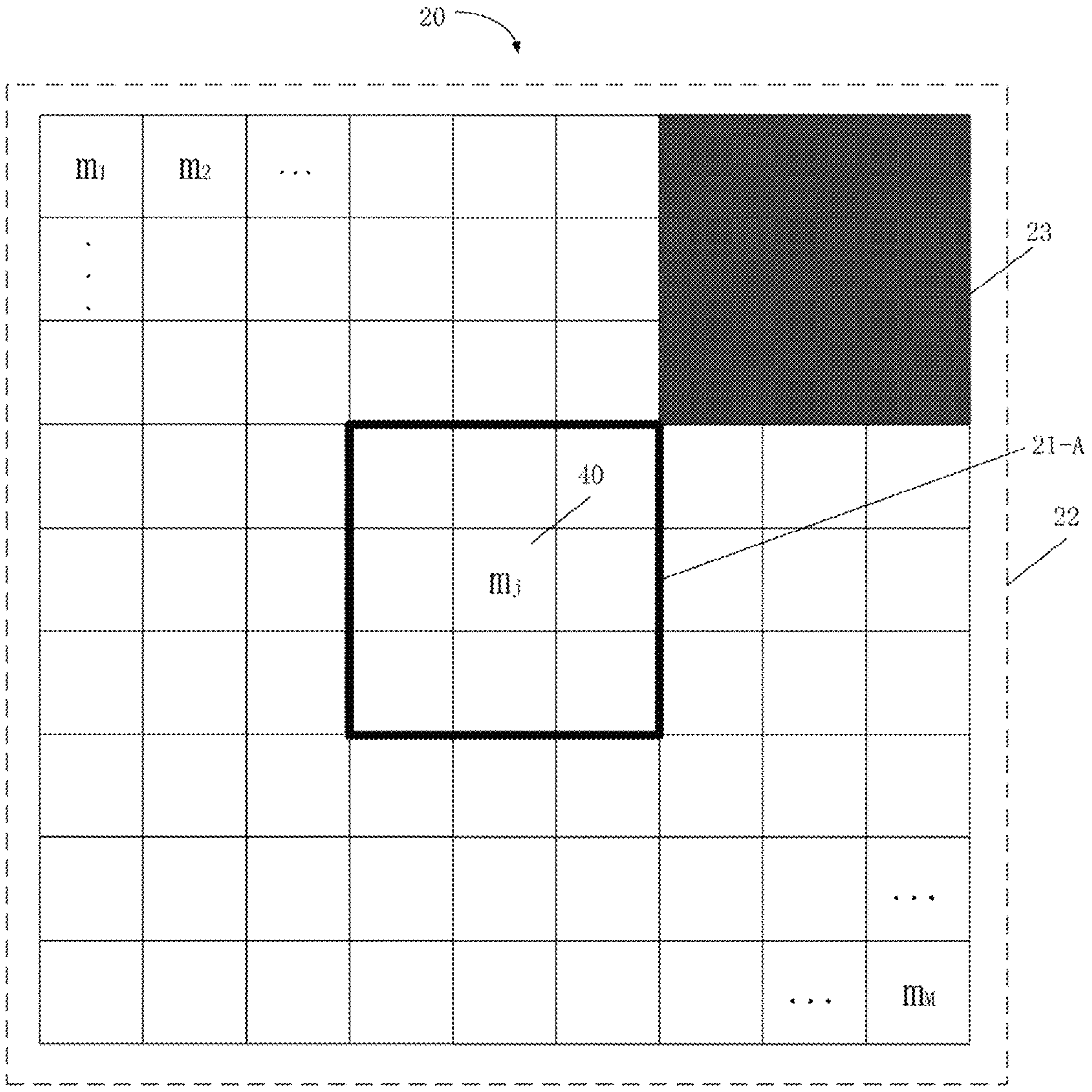
FIG. 4*a* is a schematic diagram of determining spatial domain weighted gray scale data of a target display panel in a non-edge area according to an embodiment of the present disclosure.
Figure 4B:
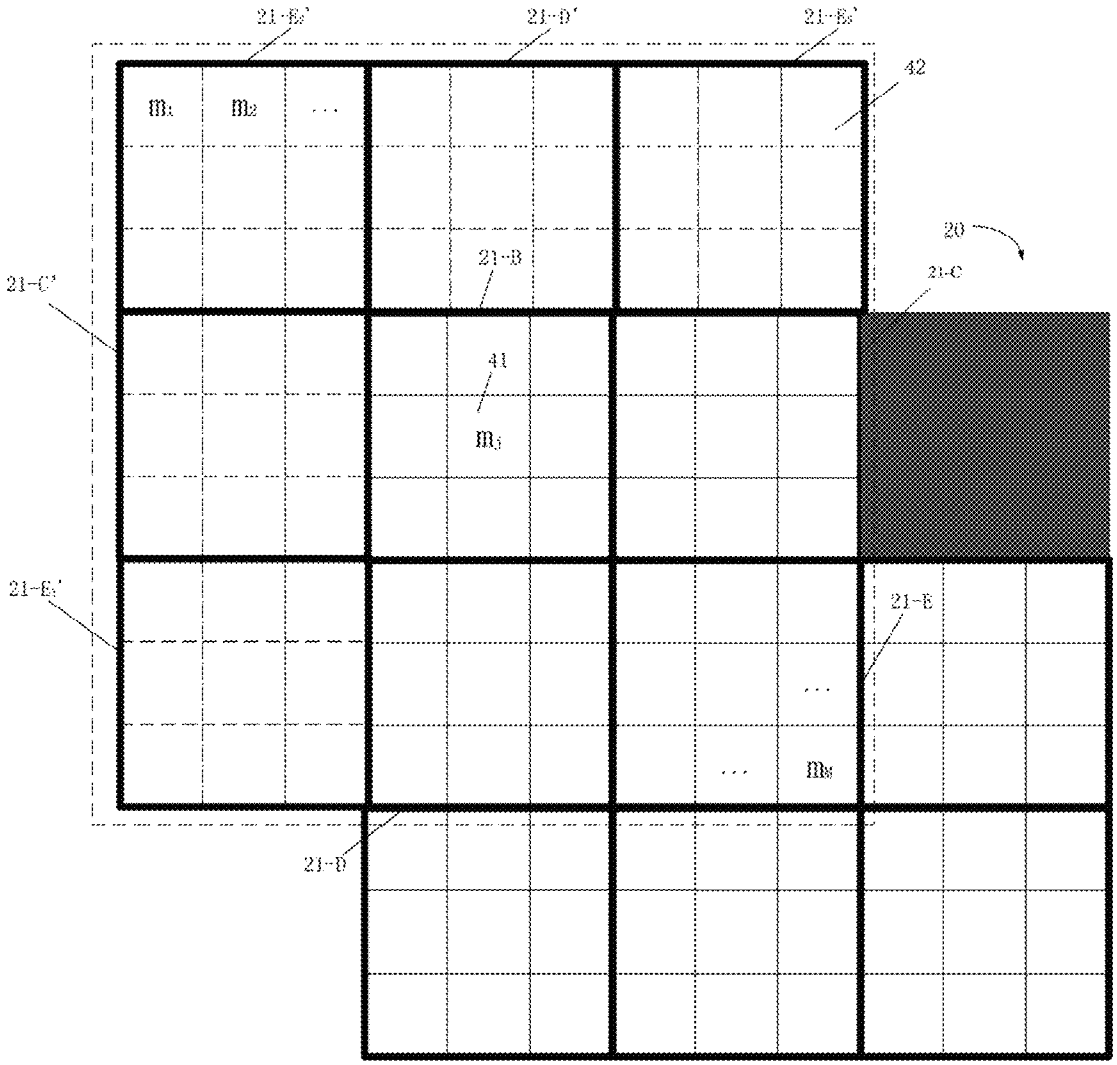
FIG. 4*b* is a schematic diagram of determining spatial domain weighted gray scale data of a target display panel in an edge area according to an embodiment of the present disclosure.

FIGS. 4*a* and 4*b* are schematic diagrams of determining spatial domain weighted gray scale data of a target display panel according to an embodiment of the present disclosure. As shown in FIG. 4*a*, a filtering coefficient matrix M×M includes temperature influence coefficients $m_1, m_2, \ldots, m_M$. Each display panel (one of the display panels is filled with gray) is divided into k×k areas (i.e., 3×3 areas, which are represented by smaller rectangular boxes in the figure). For a target display panel 21-A (represented by a bold black box in the figure) in a non-edge area of the splicing display screen, a temperature influence coefficient $m_j$ at the center of the filtering coefficient matrix M×M is aligned with a central display area 40 of the target display panel 21-A, and each of the temperature influence coefficients $m_1, m_2, \ldots, m_M$ is multiplied by a time domain weighted gray scale data $Gray_{mean}$ of a corresponding display area, and then all products are added to obtain spatial domain weighted gray scale data $Y_A$ of the target display panel 21-A. The specific process may refer to equation 2.

$$Y_A = \sum_i^M Gray_{mean}^i \times m_i, \quad \text{Equation 2}$$

where $$Gray_{mean}^i$$

represents a time domain weighted gray scale data of an $i^{th}$ display area in a preset area corresponding to the target display panel 21-A, and $m_i$ represents a temperature influence coefficient of the $i^{th}$ display area in the preset area corresponding to the target display panel 21-A.

As shown in FIG. 4*b*, for a target display panel 21-B in an edge area of the splicing display screen, a temperature influence coefficient $m_j$ at the center of the filtering coefficient matrix M×M is aligned with a central display area 41 of the target display panel 21-B, and then, time domain weighted gray scale data is supplemented into a virtual display area 42 (represented by a smaller rectangular dashed box in the figure) aligned by the filtering coefficient matrix M×M. For example, in a mirrored manner, the time domain weighted gray scale data of each display area in a display panel 21-C is supplemented into a virtual display area at a corresponding position in a virtual display panel 21-C'; the time domain weighted gray scale data of each display area in a display panel 21-D is supplemented into a virtual display area at a corresponding position in a virtual display panel 21-D'; and the time domain weighted gray scale data of each display area in a display panel 21-E is supplemented into virtual display areas at corresponding positions in virtual display panels $$21\text{-}E_1', 21\text{-}E_2' \text{ and } 21\text{-}E_3',$$

respectively. Then, each of the temperature influence coefficients $m_1, m_2, \ldots, m_M$ in the filtering coefficient matrix M×M is multiplied by a time domain weighted gray scale data $Gray_{mean}$ of a corresponding display area, and then all products are added to obtain spatial domain weighted gray scale data $Y_B$ of the target display panel 21-B. The specific process may be determined according to equation 2, and repeated descriptions are omitted.

The compensation coefficient determining unit 34 is configured to determine, according to the time domain weighted gray scale data and the temperature influence coefficient of each display area in the target display panel, a compensation coefficient scaling factor of the display area, and determine, according to the compensation coefficient scaling factor of the display area and the spatial domain weighted gray scale data of the target display panel, a gray scale compensation coefficient of the display area; and take the gray scale compensation coefficient of the display area as a gray scale compensation coefficient of each pixel in the display area.

As shown in FIG. 4*a*, after temperature influence coefficient $m_j$ at the center of the filtering coefficient matrix M×M is aligned with the central display area 40 of the target display panel 21-A, the time domain weighted gray scale data $Gray_{mean}$ of each display area in the target display panel 21-A is multiplied by the corresponding temperature influence coefficient of the display area, and then all products are added to obtain first intermediate data $Y_1$. The specific process may refer to equation 3.

$$Y_1 = \sum_v^9 Gray_{mean}^v \times m_v, \quad \text{Equation 3}$$

where $$Gray_{mean}^v$$

represents a time domain weighted gray scale data of a $v^{th}$ display area of the 3×3 display areas in the target display panel 21-A; and $m_v$ represents a temperature influence coefficient of the $v^{th}$ display area of the 3×3 display areas in the target display panel 21-A.

The time domain weighted gray scale data of the central display area 40 is multiplied by the corresponding temperature influence coefficient to obtain second intermediate data Y2. A ratio of the second intermediate data to the first intermediate data is a compensation coefficient scaling factor τ of the central display area 40. The specific process may refer to equation 4.

$$\tau = \frac{Y_2}{Y_1} = \frac{\text{Gray}^j_{mean} \times m_j}{\sum_v^9 \text{Gray}^v_{mean} \times m_v}, \quad \text{Equation 4}$$

where $$\text{Gray}^j_{mean}$$

represents the time domain weighted gray scale data of the central display area 40, and $m_j$ represents the temperature influence coefficient of the central display area 40.

The compensation coefficient scaling factor of the central display area 40 is multiplied by the spatial domain weighted gray scale data of the target display panel 21-A to obtain a gray scale compensation coefficient S of the central display area 40. The specific process may refer to equation 5.

$$S = \tau \times Y_A. \quad \text{Equation 5}$$

The gray scale compensation coefficient of the central display area 40 is taken as the gray scale compensation coefficient S of each pixel in the central display area 40.

Similarly, for the calculation process of the compensation coefficient scaling factor and the gray scale compensation coefficient for any other display area in the preset area, reference may be made to the calculation process of the central display area 40, and description of repeated steps is omitted here.

A gray scale compensation module 203 is configured to determine target gray scale compensation data according to the gray scale compensation coefficient and the initial gray scale compensation data; and perform, according to the target gray scale compensation data, gray scale compensation on the current frame image data to obtain compensated frame image data.

In a specific implementation, the gray scale compensation module 203 is configured to determine target gray scale compensation data of each pixel according to the initial gray scale compensation data $d_0$ and the gray scale compensation coefficient S. In determination of the target gray scale data of a pixel (x,y), the initial gray scale compensation data $d_0^{(x,y)}$ corresponding to the pixel may be multiplied by the gray scale compensation coefficient $S^{(x,y)}$ of the pixel to obtain the target gray scale compensation $$d^{(x,y)}_{target}$$

of the pixel (x,y). The specific process may refer to equation 6.

$$d^{(x,y)}_{target} = S^{(x,y)} \times d_0^{(x,y)}. \quad \text{Equation 6}$$

In some examples, in order to improve uniformity and consistency of the gray scale compensation, for sub-pixels of each pixel in the current frame image data, i.e., the three channels red (R), green (R) and blue (B), the target gray scale compensation data, i.e., $$\mu_1 \times d^{(x,y)}_{target},\ \mu_2 \times d^{(x,y)}_{target} \text{ and } \mu_3 \times d^{(x,y)}_{target},$$

of the sub-pixels are respectively determined according to a luminance attenuation ratio of the three channels, i.e., R:G:B=$\mu_1$:$\mu_2$:$\mu_3$. Then, gray scale compensation is performed on sub-pixels of each pixel in the current frame image data, where a red channel value $$r' = r - \mu_1 \times d^{(x,y)}_{target},$$

a green channel value $$g' = g - \mu_2 \times d^{(x,y)}_{target},$$

and a blue channel value b'=b−

$$\mu_3 \times d^{(x,y)}_{target}.$$

That is, the updated three channels RGB of the pixel are obtained, and at this time, the updated three channel values are the compensated frame image data. Each pixel in the current frame image data is compensated in the above manner to obtain the compensated frame image data.

In some examples, the R channel is most susceptible to temperature variations due to its own characteristics, and thus, the gray scale has the greatest attenuation in the R channel. In order to improve the efficiency of data processing, the target gray scale compensation data $$d^{(x,y)}_{target}$$

is subtracted from the R channel of each pixel in the current frame image data to obtain updated data of the R channel of the pixel and thus updated three channels RGB of the pixel (where values of the channel G and the channel B remain unchanged). In this case, the updated three channel values are the compensated image data. Each pixel in the current frame image data is compensated in the above manner to obtain compensated frame image data.

Figure 5:
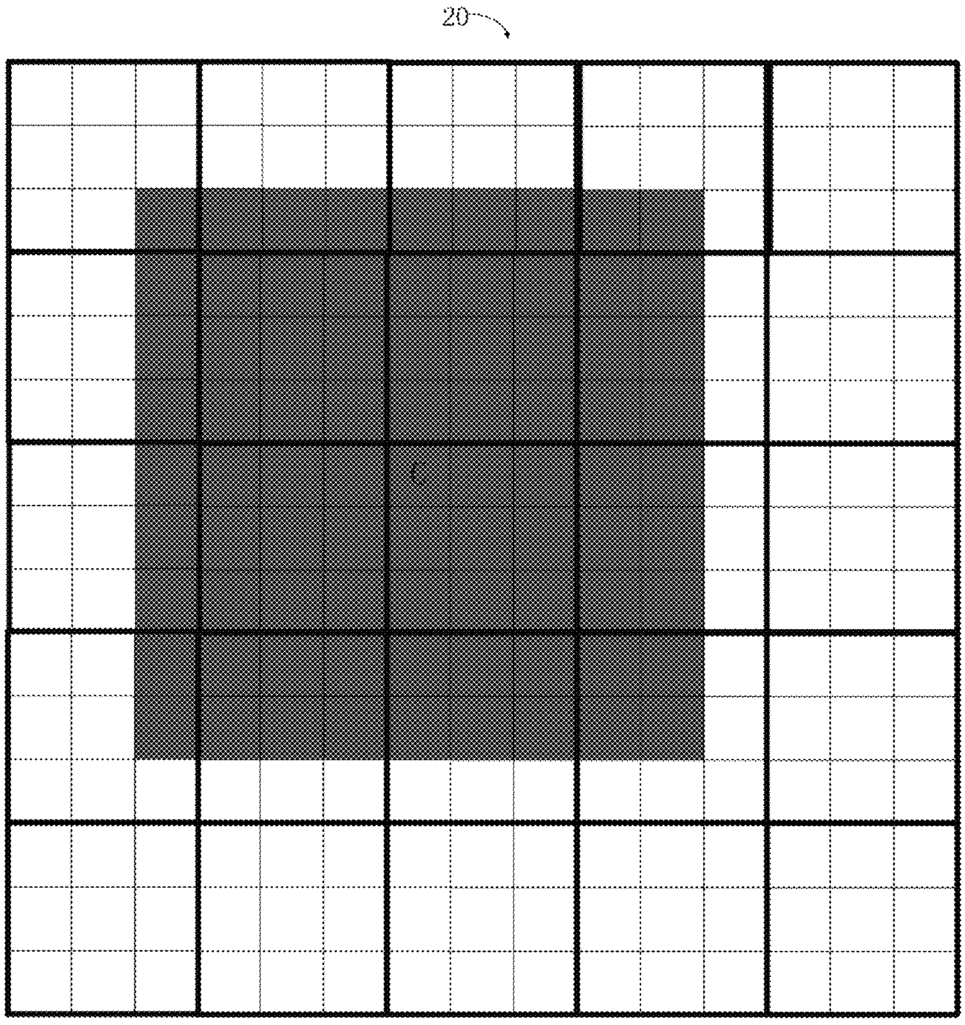
FIG. 5 is a schematic diagram of display panels spliced together according to an embodiment of the present disclosure.

In some examples, due to a splicing gap between display panels spliced with each other in the splicing display screen, there is a relatively large difference in the target gray scale compensation data $$d^{(x,y)}_{target}$$

between two adjacent display areas of different display panels. Therefore, during gray scale compensation on the current frame image data, filtering on the target gray scale compensation data is desired in order to further optimize the gray scale compensation at splicing positions of the display panels. FIG. 5 is a schematic diagram of display panels spliced together according to an embodiment of the present disclosure. Specifically, as shown in FIG. 5, taking the display area where the target gray scale compensation data $$d_{target}^{(x,y)}$$

is located as an arbitrary display area C in the preset area to be set, a preset area (e.g., the portion filled with gray in FIG. 5) is determined according to this display area C. It should be noted that the preset area includes display areas (each denoted by a smaller thin solid line rectangle in FIG. 5) in different display panels (each denoted by a thick solid line rectangle in FIG. 5, and including 3×3 display areas). An average value of the target gray scale compensation data $$d_{target}^{(x,y)}$$

of 9×9 display areas in the preset area is calculated and used as filtering gray scale compensation data $$d_{filtering}^{(x,y)}$$

of a display area C in the 9×9 preset area. Then, according to the filtering gray scale compensation data $$d_{filtering}^{(x,y)},$$

gray scale compensation is performed on the current frame image data of the display area C to obtain compensated frame image data of the display area C. Here, by determining the filtering gray scale compensation data $$d_{filtering}^{(x,y)}$$

of each display area in the splicing display screen, gray scale compensation is performed on the current frame image data, which can smooth the influence of the splicing gap between display panels, and obtain more accurate compensated frame image data.

Similarly, for the filtering process and the gray scale compensation process on the target gray scale compensation data corresponding to any other display area, reference may be made to the specific implementation process of the first display area described above, and repeated descriptions are omitted.

A second cache module 109 is configured to store, after obtaining the compensated frame image data, the current frame image data in a historical cache library to update the historical frame image data.

In some examples, as shown in FIG. 3, the compensation coefficient determining module 202 further includes a plurality of first data processing units 35 and a plurality of second data processing units 36. Each first data processing unit 35 is configured to process gray scale data of pixels in one display area. The display area includes at least one row of pixels.

The first data processing unit 35 is specifically configured to sequentially accumulate gray scale data of each row of pixels in the display area, and determine a summed gray scale data of pixels in the display area.

Here, the number of first data processing units 35 may be greater than or equal to the number of display areas in one row of display areas in the splicing display screen. Taking an arbitrary display area in the splicing display screen as an example, the display area includes h×w pixels, i.e., w rows of pixels in total. The first data processing unit 35 is specifically configured to accumulate gray scale data of a first row of pixels to obtain first accumulated data; then store the first accumulated data into a first storage space; then accumulate gray scale data of a second row of pixels to obtain second accumulated data; and extract the first accumulated data from the first storage space, sum up the first accumulated data and the second accumulated data, and store a summation result into the first storage space, so on and so forth. For the gray scale data of other rows of pixels, the above accumulation process is repeated, until a summed gray scale data of all the pixels in the display area obtained by accumulation is stored in the first storage space. The number of first storage spaces may be greater than or equal to the number of display areas in one row of display areas in the splicing display screen. For example, if the number of first storage spaces is equal to the number of display areas in one row of display areas in the splicing display screen, the first storage space and the first data processing unit 35 are in one-to-one correspondence.

The second data processing unit 36 is specifically configured to determine second gray scale data of the display area according to the number of pixels in the display area and the summed gray scale data of pixels in the display area. The second gray scale data includes at least second gray scale data in the historical frame image data, so that the time domain weighted gray scale data of the display area is determined from the second gray scale data in at least one frame of the historical frame image data of the display area.

Here, the second gray scale data of the display area is obtained by dividing the summed gray scale data by the number of pixels in the display area. That is, the second gray scale data of the display area is average gray scale data of the pixels in the display area.

It should be noted that the second gray scale data may be calculated from the historical frame image data, and then stored in a second storage space. Meanwhile, for the current frame image data, area division and average gray scale calculation of the gray scale data of pixels in the current frame image data are performed in a similar manner to obtain second gray scale data of the current frame image data. The second gray scale data of the current frame image data is used for computation of a current frame image data.

It should be noted that the second storage space may store second gray scale data of one display area; and the gray scale compensation circuit 100 includes a plurality of second storage spaces storing second gray scale data of display areas of each of N frames of historical frame image data. The second gray scale data of display areas of each of the N frames of historical frame image data are used for determining the time domain weighted gray scale data of the display area.

The number of second storage spaces is greater than or equal to a total number of display areas in the splicing display screen. For example, the second storage spaces are arranged in one-to-one correspondence with the display areas, and each second storage space is configured to store the second gray scale data of a corresponding display area. Taking the case where a splicing display screen includes 24×12 display panels, and each display panel is divided into 3×3 display areas as an example, 72×36 second storage spaces are desired to be provided in advance.

Figure 6:
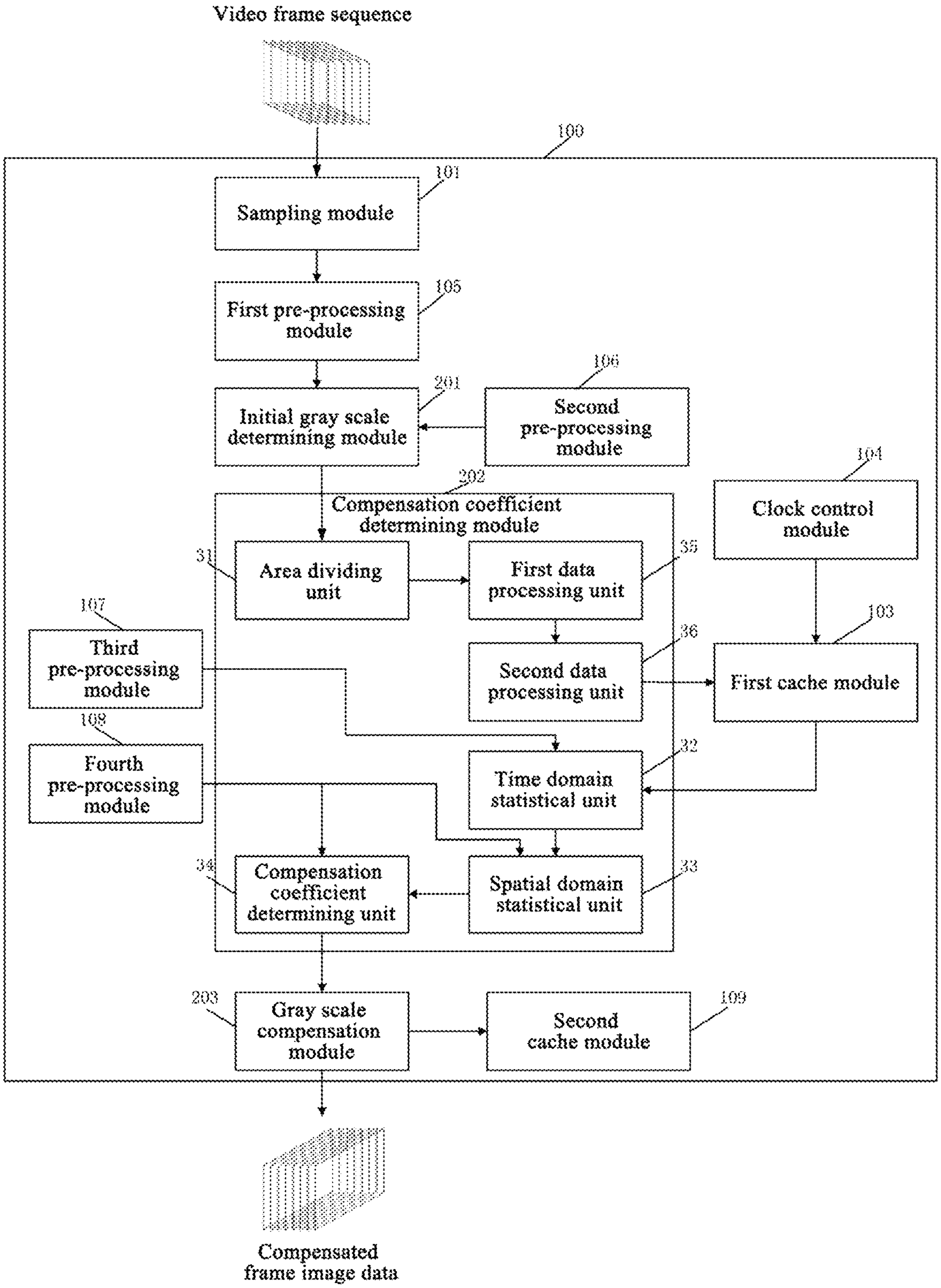
FIG. 6 is a schematic diagram showing a specific structure of a gray scale compensation circuit according to an embodiment of the present disclosure.
Figure 7:
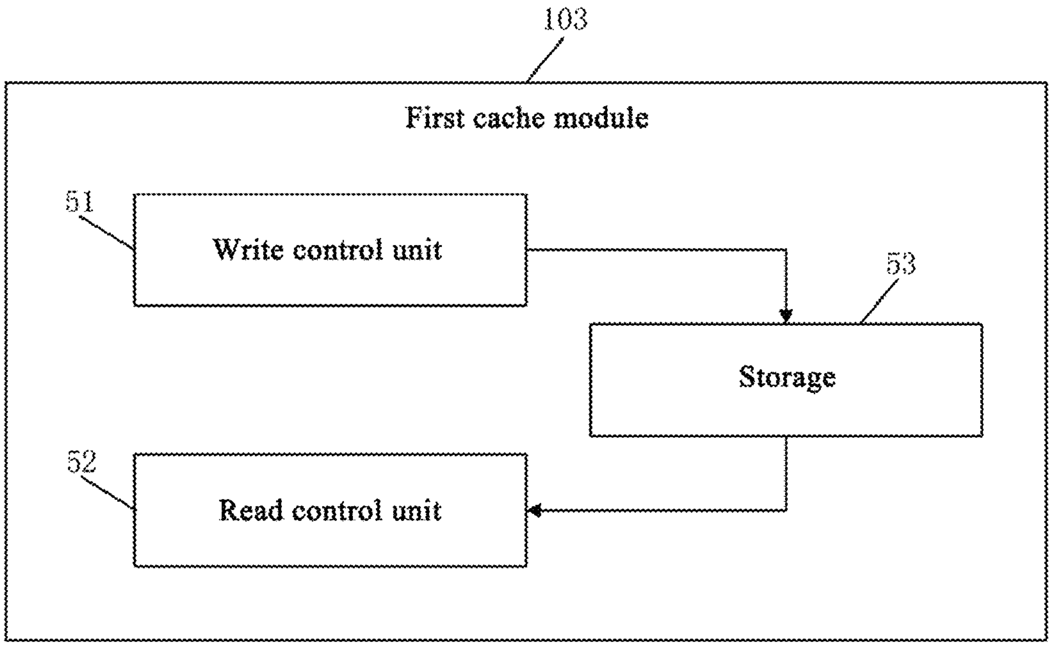
FIG. 7 is a schematic structural diagram of a first cache module according to an embodiment of the present disclosure.

FIG. 6 is a schematic diagram showing a specific structure of a gray scale compensation circuit according to an embodiment of the present disclosure. In some examples, as shown in FIG. 6, the gray scale compensation circuit 100 further includes a first cache module 103 and a clock control module 104. FIG. 7 is a schematic structural diagram of a first cache module according to an embodiment of the present disclosure. As shown in FIG. 7, the first cache module 103 includes a write control unit 51, a read control unit 52 and a storage 53.

The clock control module 104 is configured to generate, according to a field synchronization signal, a write signal for controlling the second gray scale data to be written into the storage 53.

It should be noted that, to synchronize line scanning and field scanning rules of a receiving end of television signals with that of a transmitting end, the transmitting end sends a pulse signal to the receiver after field scanning is normally finished, to indicate that a current field is finished. This pulse signal is a field synchronization signal. Whether to generate a write signal is determined based on distribution of high and low levels in the field synchronization signal. Specifically, if the distribution of high and low levels shows that the current high level satisfies a sampling interval from a previous frame of sampling, a write signal is generated.

The write control unit 51 is configured to receive, in response to the write signal, the second gray scale data of each display area and write the second gray scale data of each display area into the storage 53. Based on the gray scale compensation of the current frame image data, the second gray scale data of the N frames of historical frame image data of each display area are received. The storage 53 may be a double data rate (DDR) 53, such as a DDR for reading and writing video signals, which may be made of a semiconductor device, capable of transferring data twice within one clock cycle, and characterized by a fast data reading rate. Specifically, for each of the N frames of historical frame image data, the DDR is configured to write the second gray scale data of the historical frame image data of each display area received by the write control unit 51 via a bus protocol interface.

The read control unit 52 is configured to read the second gray scale data from the storage 53 so that the second gray scale data is transmitted to the time domain statistical unit 32. The historical frame image data of the N frames of historical frame image data of a same display area is transmitted to a same processing branch of the time domain statistical unit 32 and used in calculation of the time domain weighted gray scale data of the display area. The historical frame image data of the N frames of historical frame image data of different display areas is transmitted to different processing branches of the time domain statistical unit.

Figure 8:
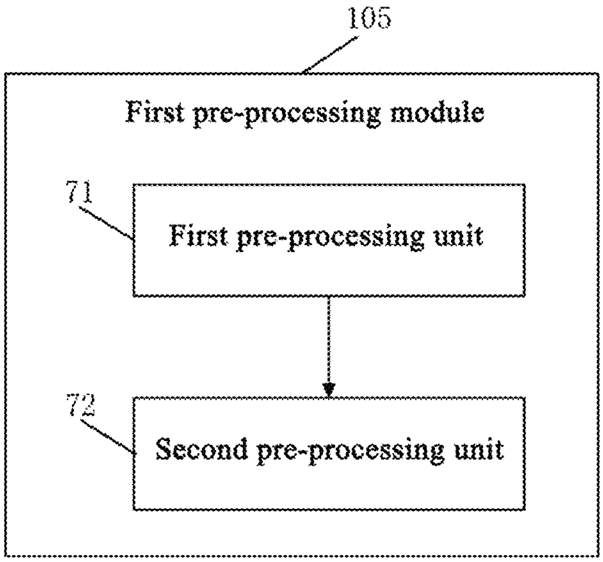
FIG. 8 is a schematic structural diagram of a first pre-processing module according to an embodiment of the present disclosure.

In some examples, as shown in FIG. 6, the gray scale compensation circuit 100 further includes a first pre-processing module 105. The first pre-processing module 105 is configured to determine, based on pixel information of sub-pixels of each pixel in the current frame image data, first gray scale data of the pixel. FIG. 8 is a schematic structural diagram of a first pre-processing module according to an embodiment of the present disclosure. As shown in FIG. 8, the first pre-processing module 105 includes a first pre-processing unit 71 and a second pre-processing unit 72. The first pre-processing unit 71 is configured to acquire a gray scale ratio of sub-pixels of each pixel in the current frame image data. The second pre-processing unit 72 is configured to determine the first gray scale data according to the gray scale ratio and pixel information of the sub-pixels.

It should be noted that the pixel in the image includes three sub-pixels, for example, a red sub-pixel, a green sub-pixel, and a blue sub-pixel. The red sub-pixel, the green sub-pixel and the blue sub-pixel correspond to three channels of the pixel, respectively. That is, the red sub-pixel corresponds to a red channel R, the green sub-pixel corresponds to a green channel G, and the blue sub-pixel corresponds to a blue channel B. The pixel information of a sub-pixel may be a channel value of a channel corresponding to the sub-pixel, that is, a red channel value r corresponding to the red channel R, a green channel value g corresponding to the green channel G, and a blue channel value b corresponding to the blue channel B.

In some examples, given that a gray scale ratio of the red, green, and blue sub-pixels $R:G:B=\alpha 1:\alpha 2:\alpha 3$, and the channel values corresponding to the sub-pixels are denoted as r, g and b, then the first gray scale data is obtained by weighted summation of the three channels R, G and B according to the gray scale ratio, i.e., $\alpha 1\times r+\alpha 2\times g+\alpha 3\times b$.

The gray scale ratio of the sub-pixels may be preset and directly obtained. The three RGB channels of the splicing display screen correspond to three colors of lights which differ greatly in the light-emitting and heating efficiency. The splicing display screen is lit with a pure color, and after the temperature is stable, a temperature rise ratio then is the gray scale ratio of the three channels. Therefore, the first pre-processing unit 71 is configured to determine a gray scale ratio, which specifically includes lighting the splicing display screen according to sub-colors of each sub-pixel, to obtain a temperature variation of the splicing display screen in each sub-color, and taking the temperature variation of the splicing display screen in each sub-color as a gray scale ratio corresponding to the sub-pixel.

The sub-colors of the sub-pixels include red, green, and blue.

Figure 9:
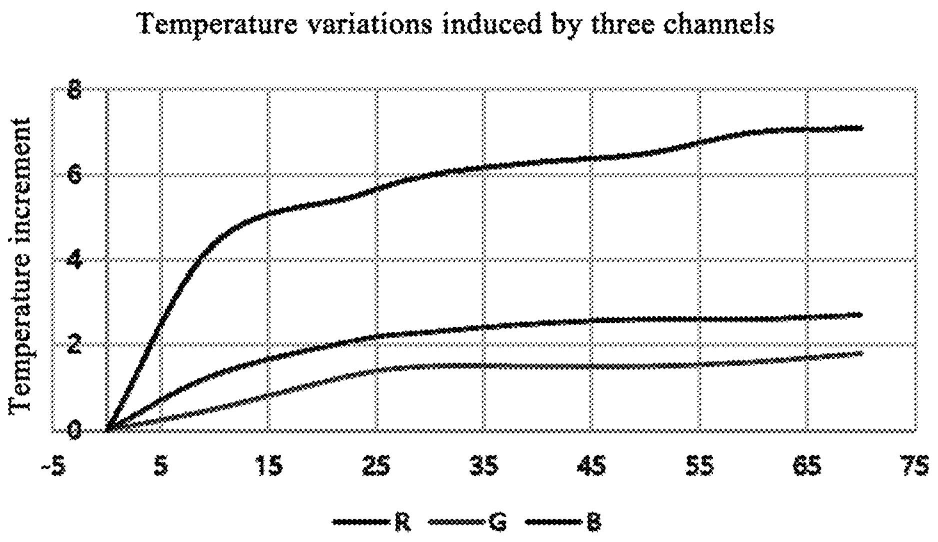
FIG. 9 is a graph of temperature variations induced by three channels according to an embodiment of the present disclosure.

FIG. 9 is a graph of temperature variations induced by three channels according to an embodiment of the present disclosure. As shown in FIG. 9, a measured variation curve of temperature vs. time of a display screen to be spliced when the three pure colors, red, green and blue, are respectively lit is illustrated. As can be seen, heating of the red light is most obvious, and when the temperature variation curve tends to be stable, the measured temperature of the red light rises by 6° C. (degrees Celsius); heating of the blue light is less obvious, and when the temperature variation curve tends to be stable, the measured temperature of the blue light rises by 2.7° C.; and heating of the green light is the least obvious, and when the temperature variation curve tends to be stable, the measured temperature of the green light rises by 2° C. The finally resulted gray scale ratio is R:G:B=6.4:2:2.7, and the gray scale ratio is normalized to obtain $R:G:B=\alpha 1:\alpha 2:\alpha 3=0.576577:0.18018:0.243243$.

In some examples, in addition to obtaining the gray scale ratio experimentally, space conversion may be performed on the pixel to use a luminance component as the first gray scale data of the pixel. Specifically, as shown in FIG. 8, the first pre-processing unit 71 is specifically configured to acquire a conversion factor for performing target color space conversion on a pixel; and the second pre-processing unit 72 is specifically configured to perform, according to the conversion factor, color space conversion on each pixel corresponding to the current frame image data, determine a luminance component of each pixel in a target color space, and use the luminance component as the first gray scale data.

The target color space may be a YCbCr color space, where Y represents luminance, i.e., the luminance component; Cb represents a concentration offset component of blue, i.e., a blue chrominance component; and Cr represents a concentration offset component of red, i.e., a red chrominance component.

The conversion factor from RGB to the YCbCr color space is fixed for a pixel and can be obtained in advance, where the sub-pixel R corresponds to a conversion factor $\beta_1$, the sub-pixel G corresponds to a conversion factor $\beta_2$, and the sub-pixel B corresponds to a conversion factor $\beta_3$, so the luminance component $Y=\beta_1\times R+\beta_2\times G+\beta_3\times B$, where $\beta_1+\beta_2+\beta_3=1$.

In some examples, since the luminance and the temperature are linearly changed at different gray scales, specifically, the luminance decreases as the temperature rises, the luminance corresponding to each gray scale at different temperatures may be determined by controlling a temperature variation range of the splicing display screen, and thus the compensation data required for maintaining a fixed luminance at each gray scale at different temperatures can be obtained.

Figure 10A:
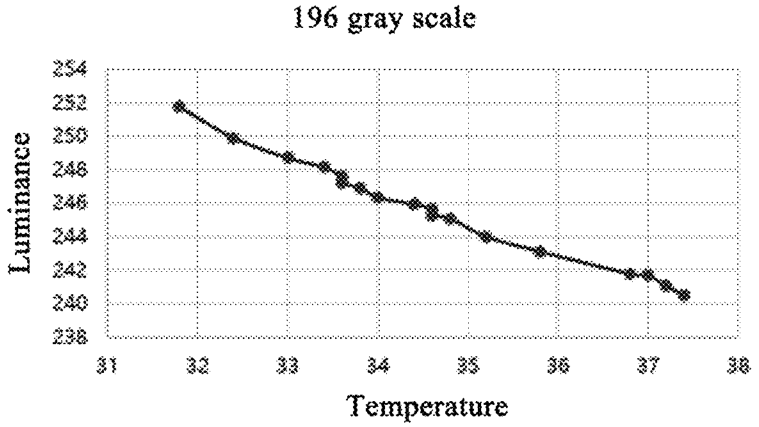
FIGS. 10*a* and 10*b* are schematic diagrams of luminance versus temperature curves according to an embodiment of the present disclosure.
Figure 10B:
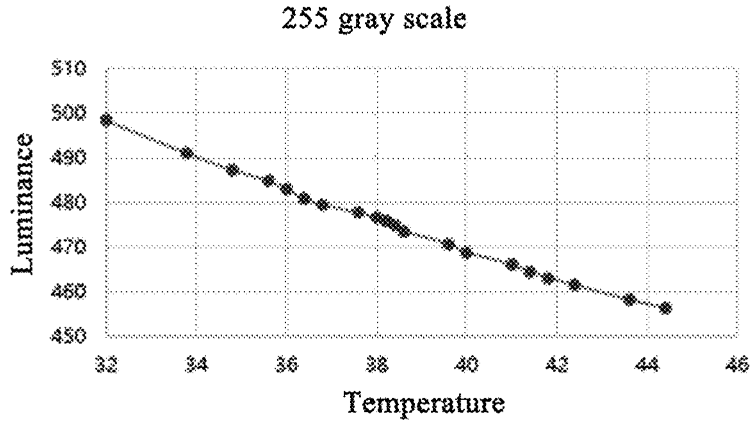

FIGS. 10*a* and 10*b* are schematic diagrams of luminance versus temperature curves according to an embodiment of the present disclosure. As shown in FIGS. 10*a* and 10*b*, FIG. 10*a* shows a variation curve of luminance decreasing as the temperature rises at 196 gray scale; and FIG. 9*b* shows a variation curve of luminance decreasing as the temperature rises at 255 gray scale.

As shown in FIG. 6, the gray scale compensation circuit 100 further includes a second pre-processing module 106. The second preset processor 102 is configured to determine a gray scale compensation data table. The gray scale compensation data table includes compensation gray scales of all gray scales in a preset gray scale range, and a peak luminance variation factor of the splicing display screen.

The second pre-processing module 106 is specifically configured for determining a compensation gray scale of each gray scale in the preset gray scale range included in the gray scale compensation data table, including: determining, when the splicing display screen is lit according to a first gray scale, an average temperature of the splicing display screen, and taking the average temperature as a first initial temperature; lighting the splicing display screen, at the first initial temperature, according to each gray scale in a preset gray scale range, and determining first luminance information of each gray scale; determining, when the splicing display screen is lit according to a second gray scale, an average temperature of the splicing display screen, and taking the average temperature as a maximum temperature; lighting the splicing display screen, at the maximum temperature, according to each gray scale in the preset gray scale range, and determining second luminance information of each gray scale; respectively determining, under the condition that the first luminance information and the second luminance information satisfy a first preset condition, a first target gray scale and a second target gray scale, and taking a difference between the first target gray scale and the second target gray scale as a compensation gray scale. The gray scale compensation data table includes compensation gray scales of all gray scales in the preset gray scale range.

The first gray scale is 0 gray scale, a white screen is lit, and when the temperature of the screen is stable, a temperature of each pixel in the splicing display screen is recorded with a thermodetector, and an average temperature across the screen is calculated and taken as a first initial temperature $T_0$. Then, the splicing display screen is maintained at the first initial temperature $T_0$, and all gray scales in a preset gray scale range of 0 to 255 are traversed in sequence, namely, the splicing display screen is lit according to the gray scales in sequence. Then, the splicing display screen is measured with a color analyzer CA 410, and a luminance $lv_i^{T_0}$ of each gray scale i is recorded.

The second gray scale is 255 gray scale, a black screen is lit, and when the temperature of the screen is stable, a temperature of each pixel in the splicing display screen is recorded with a thermodetector, and an average temperature across the screen is calculated and taken as a maximum temperature $T_{max}$. Then, the splicing display screen is maintained at the maximum temperature $T_{max}$, all gray scales in a preset gray scale range of 0 to 255 are traversed in sequence, namely, the splicing display screen is lit according to the gray scales in sequence. Then, the splicing display screen is measured with a color analyzer CA 410, and a luminance $$lv_i^{T_{max}}$$

of each gray scale i is recorded.

The first preset condition is $$lv_i^{T_{max}} \approx lv_j^{T0}.$$

All gray scales from 0 to 255 are traversed, and a first target gray scale i and a second target gray scale j satisfying the condition $$lv_i^{T_{max}} \approx lv_j^{T0}$$

are determined. The second target gray scale j is a compensation gray scale of the first target gray scale i, and the first target gray scale i has compensation data i–j. Since the luminance decreases as the temperature rises, when $$lv_i^{T_{max}} \approx lv_j^{T0},$$

i is greater than j.

As shown in table 1, the compensation data of 0 gray scale is 0, the compensation data of 1 gray scale is 0, the compensation data of 128 gray scale is $\varphi_1$, the compensation data of 254 gray scale is $\varphi_2$, and the compensation data of 255 gray scale is $\varphi_3$.

TABLE 1

| Gray scale | Compensation data | Peak luminance variation factor |
|---|---|---|
| 0 | 0 | $\gamma$ = actual peak luminance/measured peak luminance |
| 1 | 0 | / |
| . . . | . . . | / |
| 128 | $\varphi_1$ | / |

TABLE 1-continued

| Gray scale | Compensation data | Peak luminance variation factor |
|---|---|---|
| ... | ... | ... |
| 254 | $\varphi_2$ | / |
| 255 | $\varphi_3$ | / |

Also in consideration of variations in the peak luminance of the splicing display screen, the compensation data for each gray scale needs to be further adjusted. Therefore, the gray scale compensation data table further includes a peak luminance variation factor of the splicing display screen. As shown in FIG. 6, the second pre-processing module 106 is specifically configured to determine the peak luminance variation factor of the splicing display screen, including: determining, according to a preset actual peak luminance and a measured peak luminance at the second gray scale, the peak luminance variation factor of the splicing display screen.

Exemplarily, the peak luminance variation factor of the splicing display screen γ=actual peak luminance/measured peak luminance. Different splicing display screens may correspond to different maximum luminances when lit at the second gray scale. Therefore, different splicing display screens correspond to different peak luminance variation factors, the peak luminance variation factor γ is determined from a test peak luminance set by the splicing display screen, and the compensation data is adjusted with the peak luminance variation factor γ, so that the initial gray scale compensation data is calculated.

Figure 11:
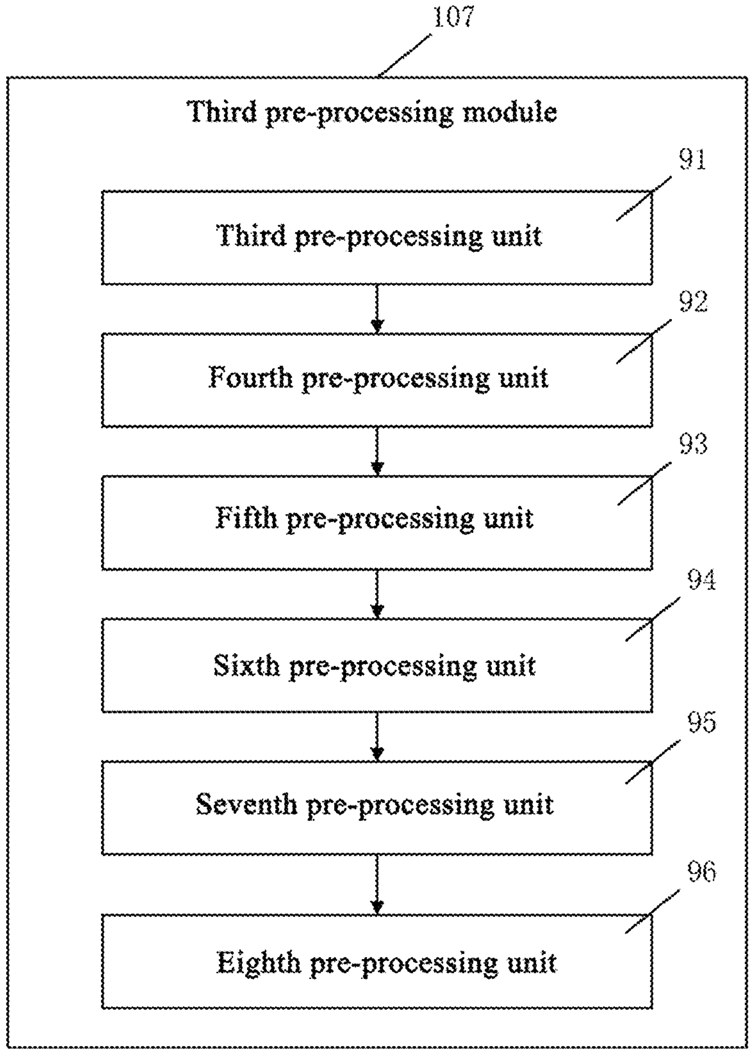
FIG. 11 is a schematic structural diagram of a third pre-processing module according to an embodiment of the present disclosure.

In some examples, as shown in FIG. 6, the gray scale compensation circuit 100 further includes a third pre-processing module 107. The third pre-processing module 107 is configured to determine a target influence coefficient for each frame of historical frame image data. FIG. 11 is a schematic structural diagram of a third pre-processing module according to an embodiment of the present disclosure. As shown in FIG. 11, the third pre-processing module 107 includes a third pre-processing unit 91, a fourth pre-processing unit 92, a fifth pre-processing unit 93, a sixth pre-processing unit 94, a seventh pre-processing unit 95 and an eighth pre-processing unit 96. It should be noted that the third pre-processing unit 91, the fourth pre-processing unit 92, the fifth pre-processing unit 93, the sixth pre-processing unit 94, the seventh pre-processing unit 95 and the eighth pre-processing unit 96 may be integrated into one processor to determine the target influence coefficient. The processor is the third pre-processing module 107. For clarity of description of the determination process of the target influence coefficient, the functions of the units in the third pre-processing module 107 are described in detail below.

The third pre-processing unit 91 is configured to acquire a time interval of a visible residual image, and determine, according to an amount of frames of image data uploaded per second, an amount of frames of image data within the time interval.

The third pre-processing unit 91 is specifically configured to light a first area of the splicing display screen according to a first gray scale, light a second area of the splicing display screen according to a second gray scale, and every target duration, light the first area and the second area simultaneously according to the second gray scale, to obtain a time interval at which a visible residual image appears.

Figure 12:
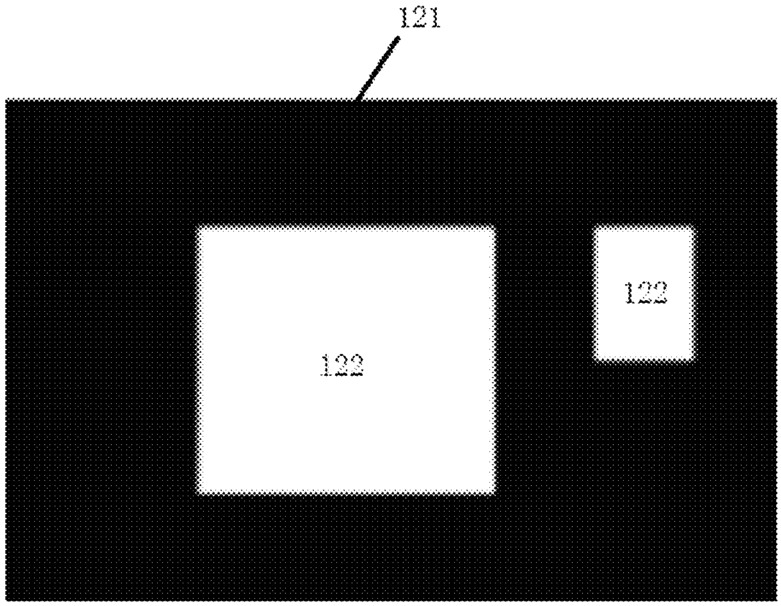
FIG. 12 is a schematic diagram showing a display effect of a splicing display screen when lit according to gray scales with a higher contrast according to an embodiment of the present disclosure.

Here, the first gray scale and the second gray scale differ greatly in contrast. For example, FIG. 12 is a schematic diagram showing a display effect of a splicing display screen when lit according to gray scales with a higher contrast according to an embodiment of the present disclosure. As shown in FIG. 12, the first gray scale is 0 gray scale, and the second gray scale is 255 gray scale. At time $t_0$, a first area 121 of the splicing display screen is lit according to the 0 gray scale, a second area 122 of the splicing display screen is lit according to the 255 gray scale, and every target duration, the first area 121 and the second area 122 are simultaneously lit according to the 255 gray scale, that is, the screen is switched to a full while screen. Then, time $t_2$ at which a residual image is visible to a human eye is recorded, and thus a time interval $\Delta t=t_2-t_0$ at which the visible residual image appears is obtained. According to an amount of frames of image data uploaded per second, which is denoted as F (i.e., frames per second, FPS), an amount of frames of image data within the time interval is determined, i.e., $N=\Delta t\times F$.

The fourth pre-processing unit 92 is configured to acquire, according to the amount of frames of image data within the time interval, multiple frames of test image data, and a preset initial influence coefficient of each frame of the test image data.

A sum of all initial influence coefficients is 1; and the initial influence coefficient of a previous frame of the test image data is greater than or equal to the initial influence coefficient of a current frame of the test image data.

Exemplarily, according to the amount of frames of image data within the time interval, N frames of test image data are acquired, and the preset initial influence coefficients of all frames of the test image data are set to be the same and added to 1, i.e., the initial influence coefficient $a_1=a_2=\ldots=a_n=1/N$.

The fifth pre-processing unit 93 is configured to acquire a first temperature increment of the splicing display screen after playing multiple frames of the test image data.

Specifically, the N frames of test image data are played, and the temperature increment (i.e., the first temperature increment $\Delta T_1$) of the splicing display screen is recorded.

The sixth pre-processing unit 94 is configured to perform weighting on third gray scale data of each pixel in each frame of the test image data using the initial influence coefficient, to obtain gray scale image data.

The third gray scale data is a gray scale value of the pixel in the test image data, and may be directly acquired. For example, the third gray scale data may be determined in a manner similar to the first gray scale data, which may refer to the specific configuration and description of the first pre-processing module 105. Weighting is performed on the third gray scale data of each pixel in each frame of the test image data using equation 1 to obtain the gray scale image data. The specific computation process is not repeated here.

The seventh pre-processing unit 95 is configured to light the splicing display screen according to the gray scale image data for a lighting duration of playing multiple frames of the test image data, and acquire a second temperature increment of the splicing display screen after the lighting duration.

The splicing display screen is lit according to the gray scale image data to display an image corresponding to the gray scale image data. The lighting duration is as long as the playing time of the N frames of the test image data, i.e., Δt, and when the splicing display screen is lit for Δt, the temperature increment (i.e., the second temperature increment $\Delta T_2$) of the splicing display screen is recorded.

The eighth pre-processing unit 96 is configured to update, when a difference between the first temperature increment and the second temperature increment does not satisfy a second preset condition, an initial influence coefficient, until the difference between the first temperature increment and the second temperature increment satisfies the second preset condition, and take the updated initial influence coefficient as the target influence coefficient.

The second preset condition is $|\Delta T_2-\Delta T_1|\leq\varepsilon$, where $\varepsilon\leq 1.5°$ C.

It is judged whether $|\Delta T_2-\Delta T_1|$ is smaller than ε, and the initial influence coefficient is updated if $|\Delta T_2-\Delta T_1|$ is smaller than ε. The eighth pre-processing unit 96 is specifically configured to respectively adjust, for each initial influence coefficient, an initial influence coefficient $a_i$ corresponding to a previous frame of the test image data, and an initial influence coefficient $a_{i+1}$ corresponding to a current frame of the test image data, so that an adjusted initial influence coefficient $a'_i$ corresponding to the previous frame of the test image data is greater than the initial influence coefficient $a_i$ corresponding to the previous frame of the test image data before the adjustment, and an adjusted initial influence coefficient $a'_{i+1}$ corresponding to the current frame of the test image data is smaller than the initial influence coefficient $a_{i+1}$ corresponding to the current frame of the test image data before the adjustment, while the condition $$\sum_{i=0}^{N} a_i = 1$$

is satisfied, thereby obtaining an updated set of initial influence coefficients $a_1, a_2, \ldots, a_n$. Then, S24 is executed repeatedly, until $|\Delta T_2-\Delta T_1|\leq\varepsilon$, thereby obtaining a latest updated set of initial influence coefficients $a_1, a_2, \ldots, a_n$ which are taken as the target influence coefficients.

In some examples, the gray scale compensation circuit 100 further includes a fourth pre-processing module 108 configured to determine a temperature influence coefficient, where M×M temperature influence coefficients constitute a filtering coefficient matrix M×M. The number of temperature influence coefficients in the filtering coefficient matrix M×M is the same as the number of display areas divided from a preset area.

The fourth pre-processing module 108 is specifically configured to acquire, for P×P display panels (i.e., a preset area) in the splicing display screen, a second initial temperature $T_1$ before the P×P display panels is lit; where P is a positive integer; light a target display panel at a central position of the P×P display panels according to a second gray scale, and perform area division on each display panel to obtain an average temperature $\overline{T}_1$ of the display areas, which means that each display area in the preset area has the average temperature $$\overline{T}_1;$$

take a difference between the average temperature $\overline{T}_1$ and the second initial temperature $T_1$ as the temperature variation of the display area; and normalize a ratio of the temperature variation of each display area to a maximum temperature variation of the display area to obtain a filtering coefficient matrix M×M.

The second gray scale is 255 gray scale. Taking P=3 and 3×3 display panels as an example, a $5^{th}$ display panel is at a central position of the 3×3 display panels, that is, the $5^{th}$ display panel is the target display panel, and each display panel is divided into k×k display areas, where k may be 3 or 5. The temperature of each pixel is recorded, according to which an average temperature $$\overline{T}_1$$

of the 3k×3k display areas is calculated.

According to the temperature variation $$\Delta T = |\overline{T}_1 - T_1|,$$

the temperature variation ΔT of each of the 3k×3k display areas is obtained, and a maximum temperature variation $\Delta T_{max}$ is determined.

A ratio ρ of the temperature variation ΔT of each display area to the maximum temperature variation $\Delta T_{max}$ of the display area is determined, and a dimensionless parameter $\rho_i=\Delta T_i/\Delta T_{max}$ is obtained, where i represents an $i^{th}$ display area.

The $\beta_i$ corresponding to each display area is normalized so that $$\sum_{i=1}^{3k\times 3k} \rho_i = 1.$$

In a second aspect, based on a same inventive concept, an embodiment of the present disclosure further provides a display method for a splicing display screen. The principle of the problem solved by the display method of a splicing display screen in the embodiment of the present disclosure is similar to that of the splicing display screen 100 described above in the embodiments of the present disclosure.

Generally, an executive body of the display method for the splicing display product provided in the embodiment of the present disclosure is a computer device with certain computing power. In some possible implementations, the display method of a splicing display screen may be implemented by a processor calling computer readable instructions stored in a storage. Specifically, the display method of a splicing display screen according to the embodiment of the present disclosure may be applied in gray scale compensation on display data in the splicing display screen. The splicing display screen includes a plurality of display panels spliced with each other and each divided into a plurality of display areas. The display method of a splicing display screen includes:

sampling, according to a preset sequence order, frame image data in a video frame sequence, and performing, after sampling each frame image data, gray scale compensation on the sampled current frame image data to obtain compensated frame image data.

The specific process of performing gray scale compensation on the sampled current frame image data to obtain the compensated frame image data is described in detail below, which includes the following steps S1 to S4.

At S1, determining initial gray scale compensation data according to first gray scale data of each pixel in the current frame image data and a pre-generated gray scale compensation data table.

At S2, obtaining, for each of a plurality of display areas, the gray scale compensation coefficient of the display area according to determined time domain weighted gray scale data and temperature influence coefficient of the display area, and spatial domain weighted gray scale data of a target display panel where the display area is located. The time domain weighted gray scale data represents an influence of at least one frame of historical frame image data of the display area on a gray scale of the current frame image data. The spatial domain weighted gray scale data represents an influence of other display panels in a preset area taking the target display panel as a center on a gray scale of the target display panel. The other display panels here are display panels in the preset area except the target display panel.

At S3, determining target gray scale compensation data according to the gray scale compensation coefficient and the initial gray scale compensation data.

At S4, performing, according to the target gray scale compensation data, gray scale compensation on the current frame image data to obtain compensated frame image data.

The display method of a splicing display screen provided in the embodiment of the present disclosure can sample, according to a preset sequence order (i.e., a playing order of a video frame sequence), frame image data in a video frame sequence, and perform, after sampling each frame image data, gray scale compensation on the sampled current frame image data. During the gray scale compensation, an influence of historical frame image data on the gray scale of the current frame image data, and an influence of other display panels on the gray scale of a target display panel in a preset area are fully considered. In other words, a time domain weighted gray scale data of the display area and a spatial domain weighted gray scale data of the target display panel where the display area is located are determined, from which a more accurate gray scale compensation coefficient of the display area can be determined. The gray scale compensation coefficient is used in gray scale compensation on the current frame image data of the display area, so that visible residual shadows of the display area can be eliminated, uniformity and consistency of the display image can be improved, and thus visual experience of a user is further improved.

Figure 13:
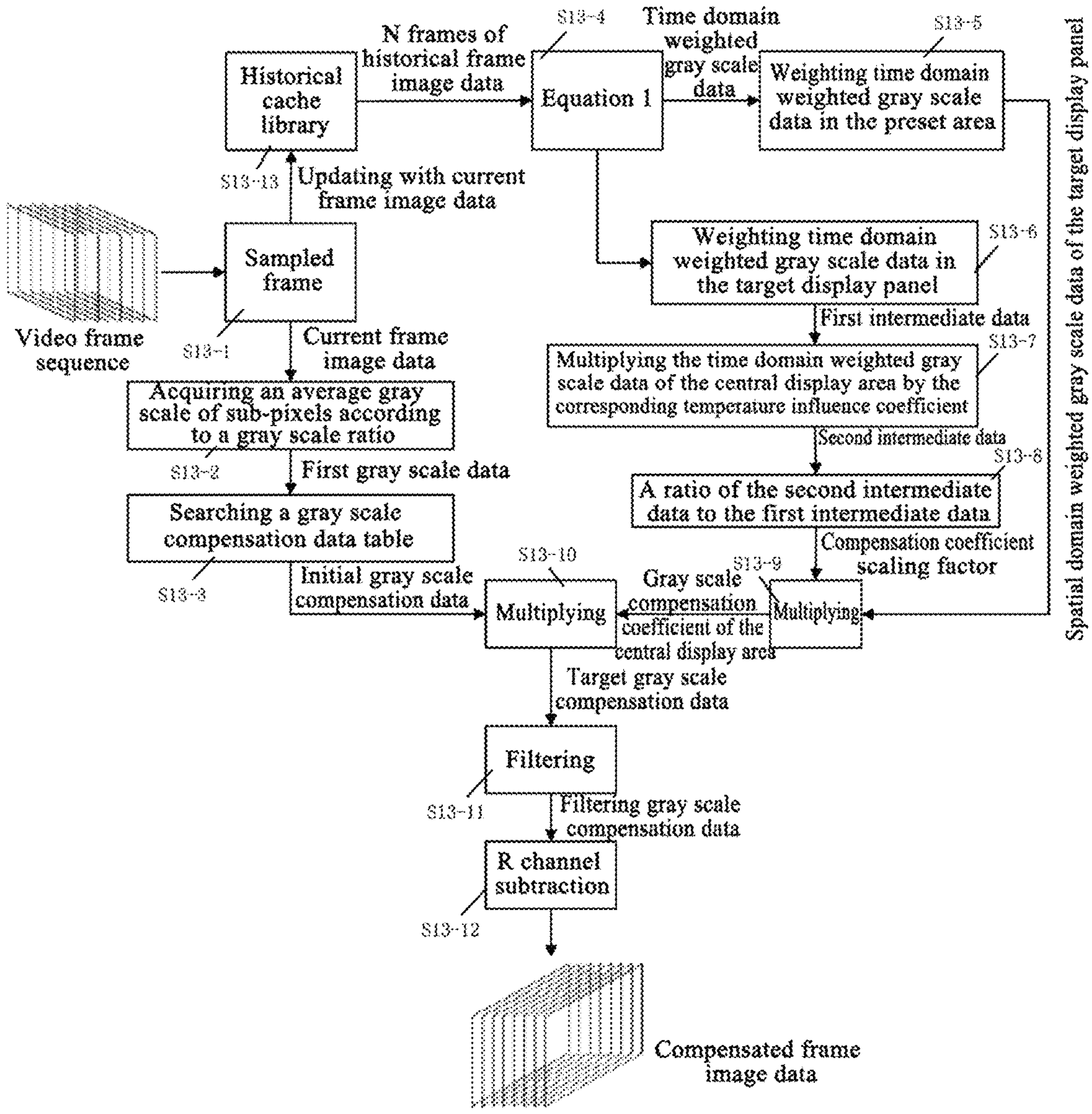
FIG. 13 is a schematic flowchart of image display data processing according to an embodiment of the present disclosure.

Exemplarily, FIG. 13 is a schematic flowchart of image display data processing according to an embodiment of the present disclosure. As shown in FIG. 13, The processing includes the following steps S13-1 to S13-13.

At S13-1, inputting a video frame sequence, sampling, according to a preset sequence order, frame image data in the video frame sequence, and taking a currently sampled frame image data as a current frame image data.

For this step, reference may be made to the above description of the specific configuration of the sampling module 101.

At S13-2, acquiring, for each pixel in the current frame image data, weighting result of sub-pixels according to a gray scale ratio, and taking the weighting result as first gray scale data of the pixel.

For this step, reference may be made to the above description of the specific configuration of the first pre-processing module 105.

At S13-3, searching a gray scale compensation data table according to the first gray scale data, to obtain initial gray scale compensation data.

For this step, reference may be made to the above description of the specific configuration of the processor 102.

At S13-4, searching N frames of historical frame image data (N≥1) from a historical cache library, and calculating according to equation 1 to obtain a time domain weighted gray scale data $Gray_{mean}$ of the display area.

For this step, reference may be made to the above description of the specific configuration of the time domain statistical unit 32.

At S13-5, multiplying, for the target display panel, each of the temperature influence coefficients $m_1, m_2, \ldots, m_M$ in the filter coefficient matrix M×M by a time domain weighted gray scale data $Gray_{mean}$ of a corresponding display area in the target display panel, and then adding all products, to obtain a spatial domain weighted gray scale data of the target display panel.

For this step, reference may be made to the above description of the specific configuration of the spatial domain statistical unit 33, and repeated descriptions are omitted.

At S13-6, multiplying, after the temperature influence coefficient $m_j$ at the center of the filtering coefficient matrix M×M is aligned with the central display area of the target display panel, the time domain weighted gray scale data $Gray_{mean}$ of each display area in the target display panel by the corresponding temperature influence coefficient of the display area, and then adding all products, to obtain first intermediate data.

At S13-7, multiplying the time domain weighted gray scale data of the central display area by the corresponding temperature influence coefficient, to obtain second intermediate data.

At S13-8, taking a ratio of the second intermediate data to the first intermediate data as a compensation coefficient scaling factor of the central display area.

At S13-9, multiplying compensation coefficient scaling factor of the central display area by the spatial domain weighted gray scale data of the target display panel to obtain a gray scale compensation coefficient of the central display area, and taking the gray scale compensation coefficient of the central display area as the gray scale compensation coefficient S of each pixel in the central display area.

For steps S13-6 to S13-9, reference may be made to the above description of the specific configuration of the compensation coefficient determining unit 34.

At S13-10, multiplying initial gray scale compensation data $$d_0^{(x,y)}$$

corresponding to each pixel by the gray scale compensation coefficient $S^{(x,y)}$ to obtain the target gray scale compensation data $d_{target}$ $$d_{target}^{(x,y)} = S^{(x,y)} \times d_0^{(x,y)}$$

of each pixel.

At S13-11, filtering the target gray scale compensation data $d_{target}^{(x,y)}$=

$$d_{target}^{(x,y)} = S^{(x,y)} \times d_0^{(x,y)}$$

to obtain filtering gray scale compensation data $$d_{filtering}^{(x,y)}.$$

At S13-12, subtracting the filtering gray scale compensation data $$d_{filtering}^{(x,y)}$$

from an R channel of each pixel in the current frame image data to obtain compensated frame image data.

For steps S13-10 to S13-12, reference may be made to the above description of the specific configuration of the gray scale compensation module 203.

At S13-13, storing the current frame image data in a historical cache library to update the historical frame image data.

For this step, reference may be made to the above description of the specific configuration of the cache module.

Detailed description of each of steps S13-1 to S13-13 may refer to the detailed description of the specific implementation process in the gray scale compensation circuit 100, and repeated descriptions are omitted here.

For the determination of the gray scale compensation data table in the embodiment of the present disclosure, reference may be made to the description of the specific configuration of the second preset processor 102. For the determination of the target influence coefficient of the current frame image data according to each of the N frames of historical frame image data, reference may be made to the description of the specific configuration of the third pre-processing module 107. For the determination of the temperature influence coefficient (i.e., the filtering coefficient matrix M×M), reference may be made to the description of the specific configuration of the fourth pre-processing module 108, and repeated descriptions are omitted.

Figure 14:
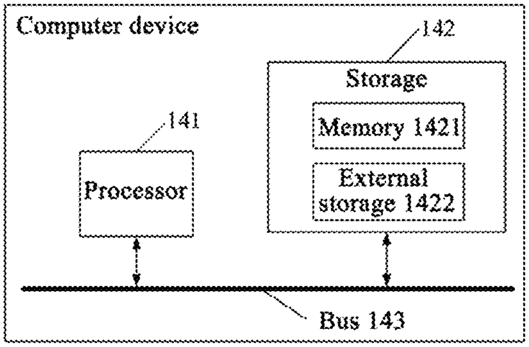
FIG. 14 is a schematic structural diagram of a computer device according to an embodiment of the present disclosure.

In a third aspect, based on a same technical concept, an embodiment of the present disclosure further provides a computer device. Referring to FIG. 14, a schematic structural diagram of a computer device according to an embodiment of the present disclosure is shown. The computer device includes:

a processor 141, a storage 142, and a bus 143. The storage 142 stores thereon machine-readable instructions executable by the processor 141. The processor 141 is configured to execute the machine-readable instructions stored on the storage 142, and when executing the machine-readable instructions, the processor 141 performs each step of the display method of a splicing display screen as described above.

The storage 142 includes a memory 1421 and an external storage 1422. The memory 1421, also called internal storage, is configured to temporarily store operational data in the processor 131 and data exchanged with the external storage 1422 such as a hard disk. The processor 141 exchanges data with the external storage 1422 through the memory 1421, and in running of the computer device, the processor 141 is in communication with the storage 142 via the bus 143 so that the processor 141 executes the instructions mentioned in the above method embodiments.

In a fourth aspect, an embodiment of the present disclosure further provides a computer-readable non-transitory storage medium having a computer program stored thereon which, when executed by a processor, causes steps of the display method of a splicing display screen as described in the method embodiments to be implemented. The storage medium may be a volatile or non-volatile computer-readable non-transitory storage medium.

In a fifth aspect, an embodiment of the present disclosure further provides an electronic product, including the splicing display screen according to the first aspect.

Figure 15:
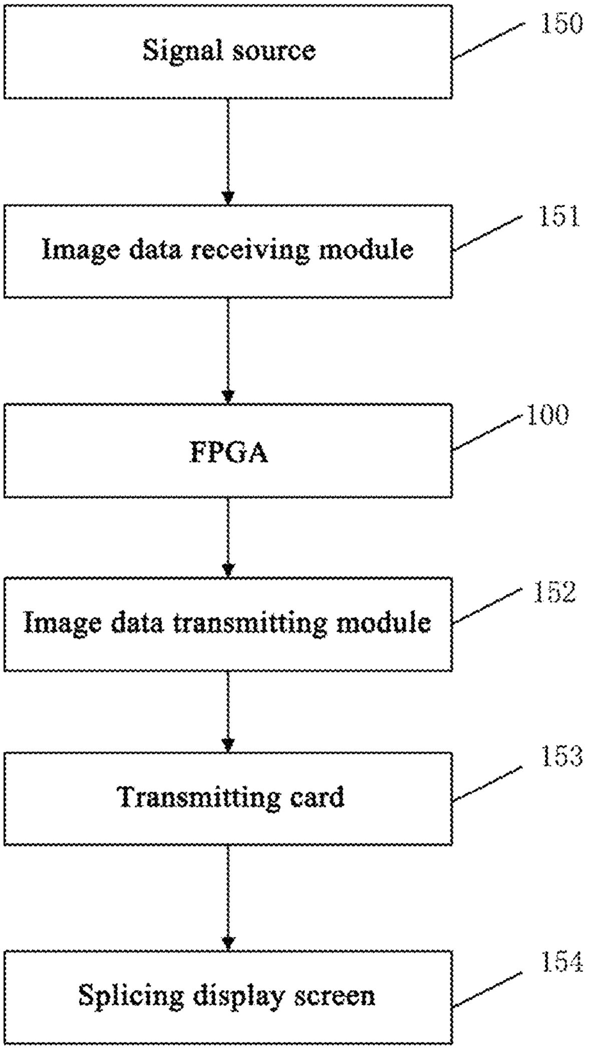
FIG. 15 is a schematic structural diagram of an electronic product according to an embodiment of the present disclosure.

Specifically, the gray scale compensation circuit 100 in the embodiments of the present disclosure may be integrated in an FPGA for gray scale compensation of a display image. In some examples, FIG. 15 is a schematic structural diagram of an electronic product according to an embodiment of the present disclosure. As shown in FIG. 15, a signal source 150 is a video signal (i.e., frame image data) in a video frame sequence, and an image data receiving interface 151 is in communication with a main board according to a VBO (V-By-One; video by one) protocol, to transmit the frame image data to an FPGA. Then, gray scale compensation is performed on the current frame image data with a gray scale compensation circuit 100 integrated in the FPGA, and the compensated frame image data is transmitted to a transmitting card 153 through an image data transmitting module 152 in communication with the main board according to a VBO (V-By-One; video by one) protocol. By means of the transmitting card 153, the compensated frame image data is transmitted to a splicing display screen 154 for display.

The electronic product including the gray scale compensation circuit 100 provided in the embodiment of the present disclosure can improve the temperature difference residual image displayed by mini LEDs, improve acceptance of the user on the image display, and can be applied to a COG glass substrate product or the like. The term "chip on glass (Cog)" means that an LED chip is directly die-bonded onto a glass substrate, and LED display is realized under driving of thin film transistors.

According to the splicing display screen and the display method thereof provided in the foregoing embodiments, frame image data in a video frame sequence can be sampled according to a preset sequence order (i.e., a playing order of a video frame sequence), and after sampling each frame image data, gray scale compensation is performed on the sampled current frame image data. During the gray scale compensation, an influence of historical frame image data on a gray scale of the current frame image data, and an influence of other display panels on a gray scale of a target display panel in a preset area are fully considered. In other words, a time domain weighted gray scale data of the display area and a spatial domain weighted gray scale data of the target display panel where the display area is located are determined, from which a more accurate gray scale compensation coefficient of the display area can be determined. The gray scale compensation coefficient is used in gray scale compensation on the current frame image data of the display area, so that visible afterimage of the display area can be eliminated, uniformity and consistency of the display image can be improved, and thus visual experience of a user is further improved.

However, the inventor of the present disclosure has found that, according to the splicing display screen and the display method thereof provided in the foregoing embodiments, essentially, it is to estimate the temperature of the splicing display screen from historical frame image data. The method has the following defects: first, the model is based on continuous calculation, and if the system has a power failure in the working process and then is powered on again, calculation of the model will be reset to an initial state and restarted, while the temperature has not dropped to the room temperature yet, thereby causing prediction errors; and second, the accuracy of the model is limited, and the temperature estimated by the model is different from the actual screen temperature, resulting in a poor compensation effect.

On this basis and to solve the above defects, the inventor of the present disclosure proposes a splicing display screen and a display method thereof with a better compensation effect.

FIG. 9 shows a measured variation curve of temperature vs. time of a display screen to be spliced when the three pure colors, red, green and blue, are respectively lit. As shown in FIG. 9, at a final stage of the temperature rise of the display screen, the temperature of the display screen tends to be a steady-state value no matter what color the display screen is lit. In other words, no matter what color the display screen is lit, the display screen will eventually reach a steady-state temperature, although different colors may correspond to different steady-state temperatures of the display screen.

Further, the inventor of the present disclosure has found in the process of technical development that: when the whole splicing screen displays the same image, the temperature difference characteristics among all display areas are basically consistent at different moments in a second half of temperature rise. That is, for any display area, a ratio of a temperature of a latter moment to a temperature of a previous moment remains substantially unchanged.

Based on the above screen characteristics found by the inventor of the present disclosure, the following solutions are proposed.

Figure 16:
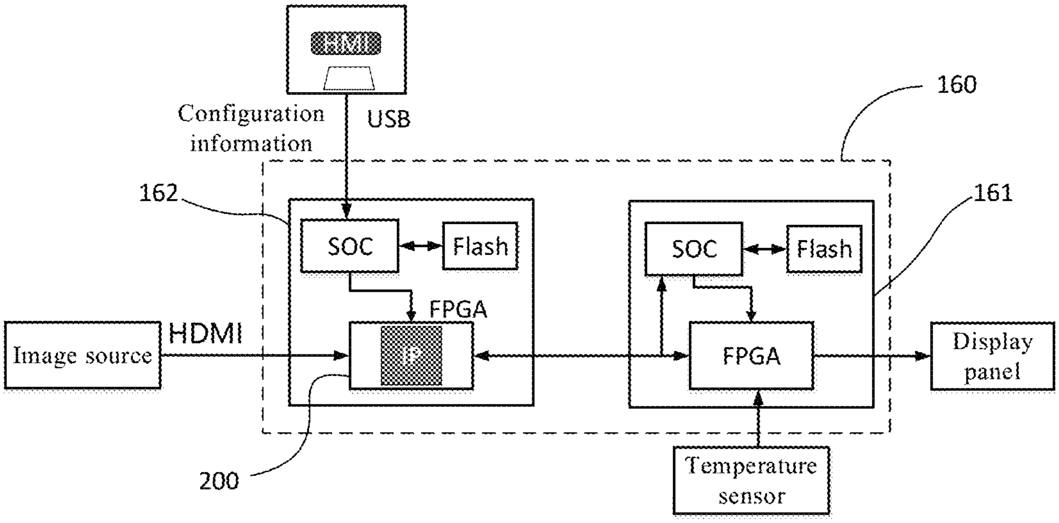
FIG. 16 is a schematic diagram of a gray scale compensation circuit in a splicing display screen according to an embodiment of the present disclosure.

FIG. 16 is a schematic diagram of a gray scale compensation circuit in a splicing display screen according to an embodiment of the present disclosure. As shown in FIG. 16, the splicing display screen includes a gray scale compensation circuit 160 configured to perform gray scale compensation on display data. The splicing display screen includes a plurality of display panels spliced with each other and each including one or more display areas, and each display area is provided with one temperature sensor configured to measure a temperature of the display area where the temperature sensor is located, and send the measured temperature to the gray scale compensation circuit 160.

In some embodiments, as shown in FIG. 16, the gray scale compensation circuit 160 includes a receiving sub-circuit 161 and a processing sub-circuit 162. The receiving sub-circuit 161 is connected to the temperature sensor, the display panel and the processing sub-circuit. The receiving sub-circuit 161 includes a flash memory Flash, a system on chip SOC, and a field-programmable gate array FPGA. The receiving sub-circuit 161 is configured to receive a plurality of instantaneous temperatures measured by all temperature sensors, and send the plurality of temperatures to the processing sub-circuit 162 as instantaneous temperature data. In addition, the receiving sub-circuit 161 is further configured to output the compensated display data to the display panel. The above functions of the receiving sub-circuit 161 may be implemented by programming the field-programmable gate array FPGA.

In some embodiments, as shown in FIG. 16, the processing sub-circuit 162 includes a flash memory Flash, a system on chip SOC, and a field-programmable gate array FPGA. The processing sub-circuit 162 is configured to control operation of the receiving sub-circuit 161. In some embodiments, the processing sub-circuit 162 may control up to 36 receiving sub-circuits 161, where each receiving sub-circuit 161 is configured to control several display panels. In some embodiments, the several display panels controlled by each receiving sub-circuit 161 are assembled into a box, and a plurality of boxes are further assembled into a splicing display screen.

As described above, each display area is provided with one temperature sensor. In this manner, a plurality of temperature sensors may be allocated to each display panel. This may increase the hardware cost, and pose a greater challenge to the performance of the receiving sub-circuit 161 and the processing sub-circuit 162. Therefore, to save the cost and reduce technical difficulties, one temperature sensor is provided for each display panel. In other words, in this case, each display area is provided with one temperature sensor, while each display panel includes only one display area.

As shown in FIG. 16, the processing sub-circuit 162 is further connected to a human-machine interface HMI and an image source. The image source is connected to the processing sub-circuit 162 via a high-definition multimedia interface (HDMI) for example, and is configured to transmit display data to the processing sub-circuit 162. The human-machine interface HMI is connected to the processing sub-circuit 162 via a USB interface for example, and is configured to transmit pre-generated configuration information to the processing sub-circuit 162.

The configuration information includes, for example, a steady-state temperature matrix, which will be described in detail below. For example, the steady-state temperature matrix transmitted by the human-machine interface HMI is stored on a flash memory Flash in the processing sub-circuit 162. When the splicing display screen is powered up, the system-on-chip SOC in the processing sub-circuit 162 writes the steady-state temperature matrix to the field-programmable gate array FPGA in the processing sub-circuit 162. An intellectual property core (IP core) is written to the field-programmable gate array FPGA in the processing sub-circuit 162 so that the field-programmable gate array FPGA is formed as a processor 200.

The structure and function of the processor 200 will be described in detail below.

Figure 17:
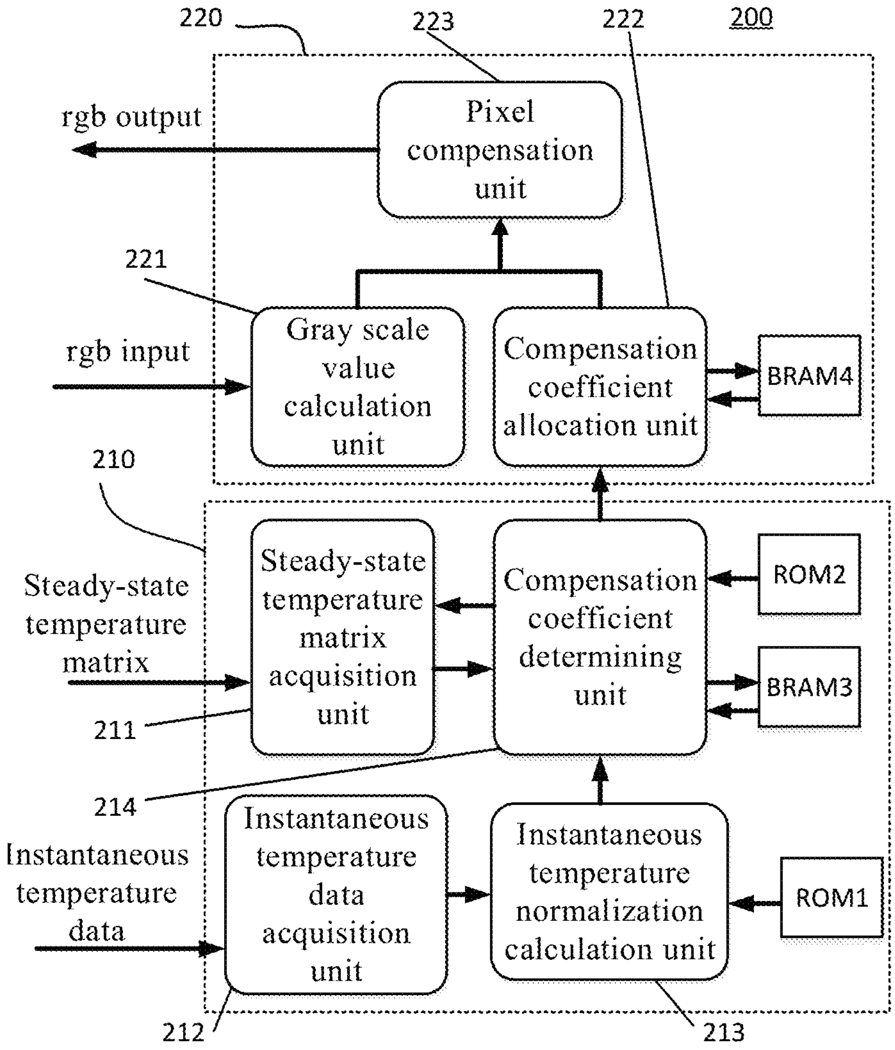
FIG. 17 is a schematic diagram of a processor according to an embodiment of the present disclosure.

FIG. 17 is a schematic diagram of a processor according to an embodiment of the present disclosure. As shown in FIG. 17, in some embodiments, the processor 200 includes a compensation coefficient determining module 210, and a gray scale compensation module 220. The compensation coefficient determining module 210 is configured to determine a gray scale compensation coefficient of each display area. The gray scale compensation module 220 is configured to perform, according to the gray scale compensation coefficient, gray scale compensation on the current frame image data to obtain compensated frame image data.

As shown in FIG. 17, the compensation coefficient determining module 210 includes a steady-state temperature matrix acquisition unit 211, an instantaneous temperature data acquisition unit 212, an instantaneous temperature normalization calculation unit 213, and a compensation coefficient determining unit 214. As shown in FIG. 17, the gray scale compensation module 220 includes a gray scale value calculation unit 221, a compensation coefficient allocation unit 222, and a pixel compensation unit 223.

It should be noted that FIGS. 16 and 17 merely show examples of the gray scale compensation circuit according to the present disclosure, and should not be construed as limiting the present disclosure.

In some embodiments, as long as the receiving sub-circuit 161 is configured to receive a plurality of instantaneous temperatures measured by all temperature sensors, and send the plurality of temperatures to the processor as instantaneous temperature data, the receiving sub-circuit 161 may have other possible configurations.

In some embodiments, as long as the processor 200 is configured to determine, according to the instantaneous temperature data and a pre-generated steady-state temperature matrix, a gray scale compensation coefficient of each display area; and perform, according to the gray scale compensation coefficient, gray scale compensation on the current frame image data to obtain compensated frame image data, the processor 200 may have other possible configurations.

The structure and function of each function unit in the processor 200 will be described in detail below.

In some embodiments, the steady-state temperature matrix acquisition unit 211 is configured to acquire the steady-state temperature matrix, and send the steady-state temperature matrix to the compensation coefficient determining unit 214.

As shown in FIG. 9, at a final stage of the temperature rise of the display screen, the temperature of the display screen tends to be a steady-state value no matter what color the display screen is lit. In the steady-state temperature matrix acquisition unit 211 of the present disclosure, when the splicing display screen is lit with a bright white image, the steady-state temperature of each display area is used as an element in the steady-state temperature matrix.

As described above, the steady-state temperature matrix is preset and pre-stored on the flash memory Flash in the processing sub-circuit 162. Here, it should be noted that the steady-state temperature matrix stored on the flash memory Flash in the processing sub-circuit 162 is normalized. Specifically, each actual temperature measured by each temperature sensor is 12-bit data. Before being transmitted to the processing sub-circuit 162, each element in the steady-state temperature matrix is processed into a normalized steady-state temperature with a data length of 14 bits.

Figure 18:
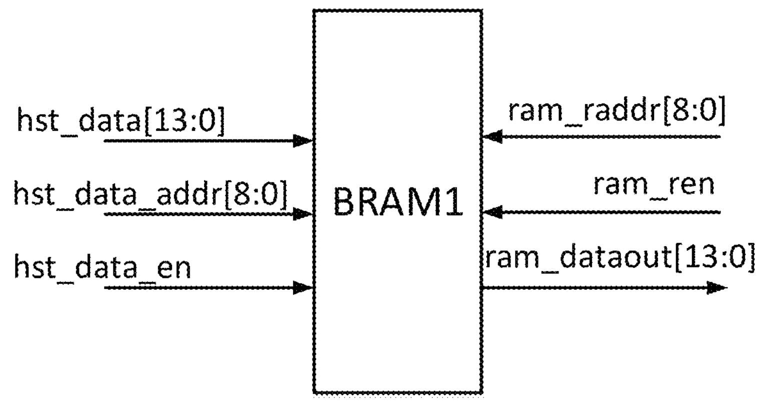
FIG. 18 is a schematic diagram of a first random access memory according to an embodiment of the present disclosure.

In some embodiments, the steady-state temperature matrix acquisition unit 211 includes a first random access memory. FIG. 18 is a schematic diagram of a first random access memory according to an embodiment of the present disclosure. In FIG. 18, an input port hst_data[13:0] is configured to write the normalized steady-state temperature with a data length of 14 bits; an input port hst_data_addr [8:0] is configured to transmit address signals each with a data length of 9 bits and corresponding to the display areas one by one; and an input port hst_data_en is configured to transmit a data write enable signal. In FIG. 18, an output port ram_dataout[13:0] is configured to read the normalized steady-state temperature with a data length of 14 bits; an input port ram_raddr[8:0] is configured to transmit address signals each with a data length of 9 bits and corresponding to the display areas one by one; and an input port ram_ren is configured to transmit a data read enable signal.

In some embodiments, the steady-state temperature matrix is stored on the first random access memory BRAM1 in a "z" shape. In other words, the normalized steady-state temperatures of the individual display areas are stored in order from left to right, and from top to bottom.

In operation of the processor 220, the IP core stores the received steady-state temperature matrix on the first random access memory BRAM1. Upon reading instantaneous temperature data, the IP core reads the steady-state temperature matrix from the first random access memory BRAM1, and calculates based on the instantaneous temperature data and the steady-state temperature matrix to obtain a compensation coefficient.

In some embodiments, the instantaneous temperature data acquisition unit 212 is configured to acquire the instantaneous temperature data, and send the instantaneous temperature data to the instantaneous temperature normalization calculation unit 213.

Figure 19:
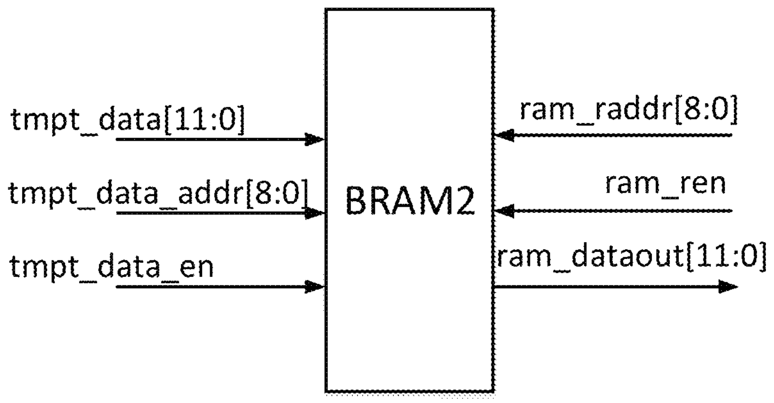
FIG. 19 is a schematic diagram of a second random access memory according to an embodiment of the present disclosure.

FIG. 19 is a schematic diagram of a second random access memory according to an embodiment of the present disclosure. As shown in FIG. 19, in some embodiments, the instantaneous temperature data acquisition unit 212 includes a second random access memory BRAM2 configured to access the instantaneous temperature data. As described above, each instantaneous temperature in the instantaneous temperature data has a data length of 12 bits.

In FIG. 19, an input port tmpt_data[11:0] is configured to write the instantaneous temperature with a data length of 12 bits; an input port tmpt_data_addr[8:0] is configured to transmit address signals each with a data length of 9 bits and corresponding to the display areas one by one; and an input port tmpt_data_en is configured to transmit a data write enable signal. In FIG. 19, an output port ram_dataout[11:0] is configured to read the instantaneous temperature with a data length of 12 bits; an input port ram_raddr[8:0] is configured to transmit address signals each with a data length of 9 bits and corresponding to the display areas one by one; and an input port ram_ren is configured to transmit a data read enable signal.

In some embodiments, the instantaneous temperature normalization calculation unit 213 is configured to perform normalization calculation on the instantaneous temperature data to obtain normalized instantaneous temperature data, and send the normalized instantaneous temperature data to the compensation coefficient determining unit 214.

As shown in FIG. 17, the splicing display screen further includes a first read-only memory ROM1. The first read-only memory ROM1 is configured to store a first correspondence table. The first correspondence table is a one-dimensional array including a plurality of preset normalization coefficients each corresponding to one preset instantaneous temperature.

In some embodiments, the instantaneous temperature normalization calculation unit 213 is configured to: determine, from the instantaneous temperature data, a highest instantaneous temperature with a maximum value tmpt_max; look up a normalization coefficient corresponding to the highest instantaneous temperature from the first read-only memory ROM1; and multiply each instantaneous temperature by the found normalization coefficient to obtain the normalized instantaneous temperature data.

Since the number of possible instantaneous temperatures is much larger than the number of elements in the steady-state temperature matrix, the length of the normalized instantaneous temperature data is set to 18 bits.

In some embodiments, the instantaneous temperature normalization calculation unit 213 is configured to read temperature data from the second random access memory BRAM2, and determine a highest instantaneous temperature with a maximum value tmpt_max. In the first read-only memory ROM1, each normalization coefficient is calculated by:

$$(1/tmpt)*2^{18},$$

where tmpt is a preset instantaneous temperature.

The process of looking up the normalization coefficient corresponding to the highest instantaneous temperature from the first read-only memory ROM1 is actually a process of looking up a normalization coefficient taking the value $(1/tmpt\_max)*2^{18}$. Since the respective normalization coefficients are stored in order on the first read-only memory ROM1 according to possible values of the instantaneous temperature data, the corresponding normalization coefficient can be found according to an address corresponding to the highest instantaneous temperature.

After the normalization coefficient is found, the instantaneous temperature normalization calculation unit 213 reads the instantaneous temperature data from the second random access memory BRAM2 again, and multiplies each instantaneous temperature by the found normalization value rom1_data, thereby obtaining a normalization value normal_data of the temperatures.

In some embodiments, the compensation coefficient determining unit 214 is configured to determine the gray scale compensation coefficient of the display area according to the steady-state temperature matrix and the normalized instantaneous temperature data.

In some embodiments, as shown in FIG. 17, the splicing display screen further includes: a third random access memory BRAM3 configured to access the normalized instantaneous temperature data; and a second read-only memory ROM2 configured to store a second correspondence table. The second correspondence table is a two-dimensional array including a plurality of proportionality coefficients, each of which simultaneously corresponds to a display area in the splicing display screen and an instantaneous temperature, and is a ratio of a steady-state temperature of the display area to the instantaneous temperature.

Figure 20:
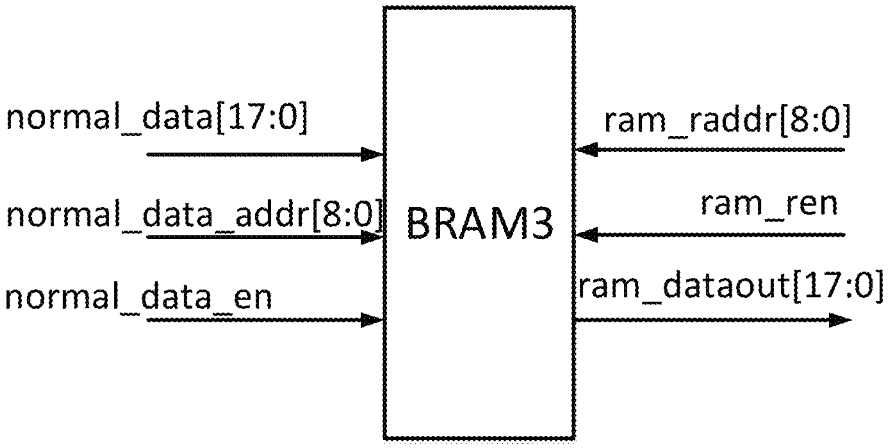
FIG. 20 is a schematic diagram of a third random access memory according to an embodiment of the present disclosure.

FIG. 20 is a schematic diagram of a third random access memory according to an embodiment of the present disclosure. In FIG. 20, an input port normal_data[17:0] is configured to write the normalized instantaneous temperature with a data length of 18 bits; an input port normal_data_addr[8:0] is configured to transmit address signals each with a data length of 9 bits and corresponding to the display areas one by one; and an input port normal_data_en is configured to transmit a data write enable signal. In FIG. 20, an output port ram_dataout[17:0] is configured to read the normalized instantaneous temperature with a data length of 18 bits; an input port ram_raddr[8:0] is configured to transmit address signals each with a data length of 9 bits and corresponding to the display areas one by one; and an input port ram_ren is configured to transmit a data read enable signal.

In some embodiments, the compensation coefficient determining unit 214 is configured to: store the normalized instantaneous temperature data on the third random access memory BRAM3, and determine a highest normalized instantaneous temperature with a maximum value; look up a corresponding proportionality coefficient from the second read-only memory ROM2 according to an address of the display area corresponding to the highest normalized instantaneous temperature; multiply each normalized instantaneous temperature by the found proportionality coefficient to obtain a full-screen instantaneous matrix; and subtract the full-screen instantaneous matrix from the steady-state temperature matrix, to obtain a gray scale compensation coefficient of each display area.

In some embodiments, the compensation coefficient determining unit 214 is further configured to: perform truncation after each normalized instantaneous temperature is multiplied by the found proportionality coefficient, such that each element in the full-screen instantaneous matrix has the same data length as each element in the steady-state temperature matrix.

For example, each normalized instantaneous temperature in the normalized instantaneous temperature data has a data length of 18 bits. The compensation coefficient determining unit 214 performs truncation after each normalized instantaneous temperature is multiplied by the found proportionality coefficient, such that the data length of each element in the full-screen instantaneous matrix and the data length of each element in the steady-state temperature matrix are both 14 bits.

In some embodiments, the gray scale value calculation unit 221 is configured to perform color space conversion on each pixel corresponding to the current frame image data, determine a luminance component of each pixel in a target color space, and send the luminance component to the pixel compensation unit 223 as first gray scale data.

Specifically, the gray scale value calculation unit 221 is configured to calculate the first gray scale data by:

$$\text{y\_data} = R*a + G*b + B*c,$$

where y_data represents the first gray scale data, R, G and B represent a red channel value, a green channel value, and a blue channel value, respectively, and a, b and c represent preset first conversion factors of the red channel value, the green channel value, and the blue channel value, respectively.

It should be noted that in the splicing display screen and the display method thereof provided the foregoing embodiments, $\alpha 1:\alpha 2:\alpha 3=0.576577:0.18018:0.243243$. In this embodiment, a, b and c may be the same as $\alpha 1$, $\alpha 2$, and $\alpha 3$, respectively.

In some embodiments, the compensation coefficient allocation unit 222 is configured to allocate to each pixel a gray scale compensation coefficient of a display area where the pixel is located, and send the allocated gray scale compensation coefficient to the pixel compensation unit 223.

In some embodiments, the splicing display screen further includes a fourth random access memory BRAM4 configured to access the compensation coefficient. The compensation coefficient allocation unit 222 is configured to look up a corresponding compensation coefficient from the fourth random access memory BRAM4 according to an address of the display area where the pixel is located, and allocate the found compensation coefficient to the pixel.

Figure 21:
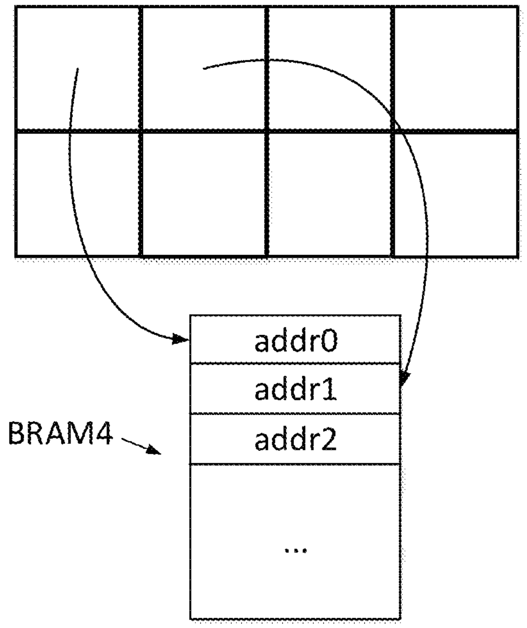
FIG. 21 is a schematic diagram of a fourth random access memory according to an embodiment of the present disclosure.

FIG. 21 is a schematic diagram of a fourth random access memory according to an embodiment of the present disclosure. As shown in FIG. 21, since the respective gray scale compensation coefficients are stored on the fourth random access memory BRAM4 in order according to an arrangement order of the respective display areas (for example, from left to right, or from top to bottom), the corresponding gray scale compensation coefficient can be found according to an address of each display area.

In some embodiments, the pixel compensation unit 223 is configured to compensate each channel value of the pixel according to the first gray scale data of the pixel and the allocated gray scale compensation coefficient.

Specifically, the pixel compensation unit 223 is configured to: calculate a gray scale compensation value according to the gray scale compensation coefficient and the first gray scale data; calculate a compensation value of each channel according to the gray scale compensation value; and calculate each compensated channel value of the pixel according to the compensation value of each channel.

In some embodiments, the pixel compensation unit 223 calculates the gray scale compensation value by:

$$\text{comp\_y} = \text{y\_data} * bram4\text{\_data},$$

where comp_y represents the gray scale compensation value, y_data represents the first gray scale data, and bram4_data represents the gray scale compensation coefficient.

In some embodiments, the pixel compensation unit 223 calculates the compensation value of each channel by:

$$comp\_rdata = comp\_y * R\_FACTOR;$$

$$comp\_gdata = comp\_y * G\_FACTOR; \text{ and}$$

$$comp\_bdata = comp\_y * B\_FACTOR;$$

where comp_rdata, comp_gdata and comp_bdata represent compensation values for red, green, and blue channels, respectively, comp_y represents the gray scale compensation value, and R_FACTOR, G_FACTOR and B_FACTOR represent preset second conversion factors for the red, green and blue channels, respectively.

It should be noted that the second conversion factors R_FACTOR, G_FACTOR and B_FACTOR are preset. The inventor of the present disclosure has verified a large number of combinations of the second conversion factors, and finally determined the second conversion factors R_FACTOR, G_FACTOR and B_FACTOR according to the actual compensation effect.

In some embodiments, the pixel compensation unit 223 calculates the compensated value of each channel by:

$$R' = R + comp\_rdata;$$

$$G' = G + comp\_gdata; \text{ and}$$

$$B' = B + comp\_bdata;$$

where R', G' and B' represent the compensated red channel value, green channel value, and blue channel value, respectively, and comp_rdata, comp_gdata and comp_bdata represent compensation values for red, green, and blue channels, respectively.

With the compensation values calculated according to the above equations, each channel can be accurately compensated. However, the image actually displayed is bright in some areas and dark in other areas, so that the first gray scale data in some display areas may reach the maximum value, for example, 255 gray scales. In this case, the channel value calculated according to the above equations may be greater than the maximum gray level.

Therefore, the above equations need to be modified. In some embodiments, the pixel compensation unit 223 calculates the compensated value of each channel by:

$$R' = R + comp\_rdata;$$

$$G' = G + comp\_gdata; \text{ and}$$

$$B' = B + comp\_bdata;$$

where R', G' and B' represent the compensated red channel value, green channel value, and blue channel value, respectively, and comp_rdata, comp_gdata and comp_bdata represent compensation values for red, green, and blue channels, respectively.

In the modified equations, the situation where the compensated channel value is greater than the maximum gray scale can be avoided. In addition, according to the modified equations, the display areas can be compensated in a unified manner, thereby improving the display uniformity.

From the above description, it can be seen that the compensation principle of the present disclosure lies in: taking a display area with the highest instantaneous temperature as a reference display area, and adjusting other display areas in the splicing display screen to a chromaticity the same as the reference display area.

In a second aspect, based on a same inventive concept, an embodiment of the present disclosure further provides a display method of a splicing display screen. The display method is applied for gray scale compensation on display data. The splicing display screen includes a plurality of display panels spliced with each other and each including one or more display areas, and each display area is provided with one temperature sensor configured to measure a temperature of the display area where the temperature sensor is located, and send the measured temperature to a gray scale compensation circuit. The gray scale compensation circuit includes a receiving sub-circuit and a processor. The method includes:

receiving, by the receiving sub-circuit, a plurality of instantaneous temperatures measured by all temperature sensors, and send the plurality of temperatures to the processor as instantaneous temperature data; and determining, by the processor and according to the instantaneous temperature data and a pre-generated steady-state temperature matrix, a gray scale compensation coefficient of each display area; and performing, according to the gray scale compensation coefficient, gray scale compensation on current frame image data to obtain compensated frame image data.

The specific steps of the display method in this embodiment of the present disclosure may refer to the description of the splicing display screen described above, which is not repeated here.

In a third aspect, based on a same technical concept, an embodiment of the present disclosure further provides a computer device. The specific details may refer to the description of FIG. 14, and thus are not repeated here.

In a fourth aspect, an embodiment of the present disclosure further provides a computer-readable non-transitory storage medium having a computer program stored thereon which, when executed by a processor, causes steps of the display method of a splicing display screen as described in the method embodiments to be implemented.

In a fifth aspect, an embodiment of the present disclosure further provides an electronic product, including a splicing display screen as shown in FIG. 16. The specific structure may refer to the description of FIG. 15, and thus are not repeated here.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A splicing display screen, comprising a gray scale compensation circuit configured to perform gray scale compensation on display data; wherein the splicing display screen comprises a plurality of display panels spliced with each other and each comprising one or more display areas, and each display area is provided with one temperature sensor configured to measure a temperature of the display area where the temperature sensor is located, and send the measured temperature to the gray scale compensation circuit; wherein the gray scale compensation circuit comprises a receiving sub-circuit and a processor;

the receiving sub-circuit is configured to receive a plurality of instantaneous temperatures measured by all temperature sensors, and send the plurality of temperatures to the processor as instantaneous temperature data; and the processor is configured to determine, according to the instantaneous temperature data and a pre-generated steady-state temperature matrix, a gray scale compensation coefficient of each display area; and perform, according to the gray scale compensation coefficient, gray scale compensation on current frame image data to obtain compensated frame image data.

2. The splicing display screen according to claim 1, wherein the processor comprises a compensation coefficient determining module, and a gray scale compensation module;

the compensation coefficient determining module is configured to determine the gray scale compensation coefficient of each display area;

the gray scale compensation module is configured to perform, according to the gray scale compensation coefficient, gray scale compensation on the current frame image data to obtain the compensated frame image data.

3. The splicing display screen according to claim 2, wherein the compensation coefficient determining module comprises a steady-state temperature matrix acquisition unit, an instantaneous temperature data acquisition unit, an instantaneous temperature normalization calculation unit, and a compensation coefficient determining unit;

the steady-state temperature matrix acquisition unit is configured to acquire the steady-state temperature matrix, and send the steady-state temperature matrix to the compensation coefficient determining unit;

the instantaneous temperature data acquisition unit is configured to acquire the instantaneous temperature data, and send the instantaneous temperature data to the instantaneous temperature normalization calculation unit;

the instantaneous temperature normalization calculation unit is configured to perform normalization calculation on the instantaneous temperature data to obtain normalized instantaneous temperature data, and send the normalized instantaneous temperature data to the compensation coefficient determining unit; and the compensation coefficient determining unit is configured to determine the gray scale compensation coefficient of the display area according to the steady-state temperature matrix and the normalized instantaneous temperature data.

4. The splicing display screen according to claim 3, wherein the steady-state temperature matrix acquisition unit comprises a first random access memory, and each element in the steady-state temperature matrix is a normalized steady-state temperature with a data length of 14 bits.

5. The splicing display screen according to claim 3, wherein the instantaneous temperature data acquisition unit comprises a second random access memory, and each instantaneous temperature in the instantaneous temperature data has a data length of 12 bits.

6. The splicing display screen according to claim 3, further comprising:

a first read-only memory configured to store a first correspondence table, wherein the first correspondence table is a one-dimensional array comprising a plurality of preset normalization coefficients each corresponding to one preset instantaneous temperature, wherein the instantaneous temperature normalization calculation unit is configured to: determine, from the instantaneous temperature data, a highest instantaneous temperature with a maximum value; look up a normalization coefficient corresponding to the highest instantaneous temperature from the first read-only memory; and multiply each instantaneous temperature by the found normalization coefficient to obtain the normalized instantaneous temperature data.

7. The splicing display screen according to claim 3, further comprising:

a third random access memory configured to access the normalized instantaneous temperature data; and a second read-only memory configured to store a second correspondence table, wherein the second correspondence table is a two-dimensional array comprising a plurality of proportionality coefficients, each of which simultaneously corresponds to a display area in the splicing display screen and an instantaneous temperature, and is a ratio of a steady-state temperature of the display area to the instantaneous temperature, wherein the compensation coefficient determining unit is configured to: store the normalized instantaneous temperature data on the third random access memory, and determine a highest normalized instantaneous temperature with a maximum value; look up a corresponding proportionality coefficient from the second read-only memory according to an address of the display area corresponding to the highest normalized instantaneous temperature; multiply each normalized instantaneous temperature by the found proportionality coefficient to obtain a full-screen instantaneous matrix; and subtract the full-screen instantaneous matrix from the steady-state temperature matrix, to obtain the gray scale compensation coefficient of each display area.

8. The splicing display screen according to claim 7, wherein each normalized instantaneous temperature in the normalized instantaneous temperature data has a data length of 18 bits.

9. The splicing display screen according to claim 7, wherein the compensation coefficient determining unit is further configured to: perform truncation after each normalized instantaneous temperature is multiplied by the found proportionality coefficient, such that each element in the full-screen instantaneous matrix has the same data length as each element in the steady-state temperature matrix.

10. The splicing display screen according to claim 2, wherein the gray scale compensation module comprises a gray scale value calculation unit, a compensation coefficient allocation unit, and a pixel compensation unit;

the gray scale value calculation unit is configured to perform color space conversion on each pixel corresponding to the current frame image data, determine a luminance component of each pixel in a target color space, and send the luminance component to the pixel compensation unit as first gray scale data;

the compensation coefficient allocation unit is configured to allocate to each pixel a gray scale compensation coefficient of a display area where the pixel is located, and send the allocated gray scale compensation coefficient to the pixel compensation unit; and the pixel compensation unit is configured to compensate each channel value of the pixel according to the first gray scale data of the pixel and the allocated gray scale compensation coefficient.

11. The splicing display screen according to claim 10, wherein the gray scale value calculation unit is configured to calculate the first gray scale data by:

$$y\_data = R*a + G*b + B*c,$$

where y_data represents the first gray scale data, R, G and B represent a red channel value, a green channel value, and a blue channel value, respectively, and a, b and c represent preset first conversion factors of the red channel value, the green channel value, and the blue channel value, respectively.

12. The splicing display screen according to claim 10, further comprising:

a fourth random access memory configured to access the compensation coefficient, wherein the compensation coefficient allocation unit is configured to look up a corresponding compensation coefficient from the fourth random access memory according to an address of the display area where the pixel is located, and allocate the found compensation coefficient to the pixel.

13. The splicing display screen according to claim 10, wherein the pixel compensation unit is configured to: calculate a gray scale compensation value according to the gray scale compensation coefficient and the first gray scale data; calculate a compensation value of each channel according to the gray scale compensation value; and calculate each compensated channel value of the pixel according to the compensation value of each channel.

14. The splicing display screen according to claim 13, wherein the pixel compensation unit calculates the gray scale compensation value by:

$$comp\_y = y\_data * bram4\_data,$$

where comp_y represents the gray scale compensation value, y_data represents the first gray scale data, and bram4_data represents the gray scale compensation coefficient.

15. The splicing display screen according to claim 13, wherein the pixel compensation unit calculates the compensation value of each channel by:

$$comp\_rdata = comp\_y * R\_FACTOR;$$

$$comp\_gdata = comp\_y * G\_FACTOR; \text{ and}$$

$$comp\_bdata = comp\_y * B\_FACTOR;$$

where comp_rdata, comp_gdata and comp_bdata represent compensation values for red, green, and blue channels, respectively, comp_y represents the gray scale compensation value, and R_FACTOR, G_FACTOR and B_FACTOR represent preset second conversion factors for the red, green and blue channels, respectively.

16. The splicing display screen according to claim 13, wherein the pixel compensation unit calculates the compensated value of each channel by:

$$R' = R + comp\_rdata;$$

$$G' = G + comp\_gdata; \text{ and}$$

$$B' = B + comp\_bdata;$$

where R', G' and B' represent the compensated red channel value, green channel value, and blue channel value, respectively, and comp_rdata, comp_gdata and comp_bdata represent compensation values for red, green, and blue channels, respectively.

17. An electronic product, comprising the splicing display screen according to claim 1.

18. A display method of a splicing display screen applied for gray scale compensation on display data; wherein the splicing display screen comprises a plurality of display panels spliced with each other and each comprising one or more display areas, and each display area is provided with one temperature sensor configured to measure a temperature of the display area where the temperature sensor is located, and send the measured temperature to the gray scale compensation circuit; wherein the gray scale compensation circuit comprises a receiving sub-circuit and a processor; wherein the method comprises:

receiving, by the receiving sub-circuit, a plurality of instantaneous temperatures measured by all temperature sensors, and sending the plurality of temperatures to the processor as instantaneous temperature data; and determining, by the processor and according to the instantaneous temperature data and a pre-generated steady-state temperature matrix, a gray scale compensation coefficient of each display area; and performing, according to the gray scale compensation coefficient, gray scale compensation on current frame image data to obtain compensated frame image data.

* * * * *